(12) United States Patent (10) Patent No.: US 12,374,045 B2
Kumar Kamaraju et al. (45) Date of Patent: Jul. 29, 2025

(54) EFFICIENT TEXTURE MAPPING OF A 3-D MESH

(71) Applicant: STREEM, LLC, Portland, OR (US)

(72) Inventors: Pavan Kumar Kamaraju, London (GB); Nikilesh Urella, Portland, OR (US); Flora Ponjou Tasse, London (GB)

(73) Assignee: STREEM, LLC, Portland, OR (US)

( * ) Notice: Subject to any disclaimer, the term of this patent is extended or adjusted under 35 U.S.C. 154(b) by 123 days.

(21) Appl. No.: 18/120,005

(22) Filed: Mar. 10, 2023

(65) Prior Publication Data

US 2023/0290061 A1 Sep. 14, 2023

Related U.S. Application Data

(60) Provisional application No. 63/318,684, filed on Mar. 10, 2022.

(51) Int. Cl.
    *G06T 17/20* (2006.01)
    *G06T 7/20* (2017.01)
    *G06T 15/04* (2011.01)
    *G06T 15/20* (2011.01)

(52) U.S. Cl.
    CPC .............. *G06T 17/20* (2013.01); *G06T 7/20* (2013.01); *G06T 15/04* (2013.01); *G06T 15/205* (2013.01); *G06T 2200/08* (2013.01)

(58) Field of Classification Search
    CPC ........... G06T 17/20; G06T 7/20; G06T 15/04; G06T 15/205; G06T 2200/08; G06T 2207/10016; G06T 2207/10028; G06T 7/579

See application file for complete search history.

(56) References Cited

U.S. PATENT DOCUMENTS

| | | | | |
|---|---|---|---|---|
| 6,072,496 | A * | 6/2000 | Guenter | G06V 20/64 345/419 |
| 9,883,102 | B2 * | 1/2018 | Yamada | H04N 23/698 |
| 10,102,657 | B2 * | 10/2018 | Huang | G06F 3/1454 |
| 10,257,494 | B2 * | 4/2019 | Sadi | H04N 13/261 |
| 10,304,244 | B2 * | 5/2019 | Chuang | G06T 13/40 |
| 10,984,587 | B2 * | 4/2021 | Duka | A63F 13/85 |
| 11,270,505 | B2 * | 3/2022 | Ponjou Tasse | H04N 5/06 |

(Continued)

OTHER PUBLICATIONS

Lee et al., TextureFusion: High-Quality Texture Acquisition for Reas Time RGB-D Scanning; http://vclab.kaist.ac.kr/cvpr2020p1/TextureFusion-Paper.pdf; Aug. 5, 2020.

(Continued)

*Primary Examiner* — Motilewa Good-Johnson

(74) *Attorney, Agent, or Firm* — Schwabe Williamson & Wyatt

(57) ABSTRACT

Frames for texturing a 3D mesh may be selected to minimize the number of frames required to completely texture the mesh, thus reducing the overhead of texturing. Keyframes are selected from a video stream on the basis of amount of overlap from previously selected keyframes, with the amount of overlap held below a predetermined threshold. The 3D mesh may also be refined and corrected to ensure a higher quality mesh application, including color correction of the selected keyframes. Other embodiments are described.

20 Claims, 12 Drawing Sheets

(56) References Cited

U.S. PATENT DOCUMENTS

| | | | | |
|---|---|---|---|---|
| 11,972,556 | B2* | 4/2024 | Holzer | G06V 10/803 |
| 2007/0031062 | A1* | 2/2007 | Pal | H04N 23/698 |
| | | | | 382/284 |
| 2009/0022422 | A1* | 1/2009 | Sorek | H04N 1/3876 |
| | | | | 382/284 |
| 2015/0243069 | A1* | 8/2015 | Knoblauch | G06T 17/205 |
| | | | | 345/420 |
| 2017/0069056 | A1* | 3/2017 | Sachs | G06T 7/571 |
| 2019/0320154 | A1* | 10/2019 | Köhle | H04N 13/204 |
| 2020/0234398 | A1* | 7/2020 | Holzer | G06T 3/067 |
| 2020/0242834 | A1* | 7/2020 | Chachek | G06T 19/20 |
| 2020/0372709 | A1* | 11/2020 | Ponjou Tasse | G06T 7/55 |
| 2020/0410752 | A1* | 12/2020 | Jiang | G06T 15/20 |
| 2021/0183044 | A1* | 6/2021 | Lin | G06V 40/16 |
| 2021/0209854 | A1* | 7/2021 | Booth | G06N 20/00 |
| 2021/0312702 | A1* | 10/2021 | Holzer | G06T 3/00 |
| 2021/0400193 | A1* | 12/2021 | Ma | H04N 5/2624 |
| 2022/0301192 | A1* | 9/2022 | Boardman | G06T 7/579 |
| 2023/0290037 | A1* | 9/2023 | Tasse | G06T 15/04 |
| 2023/0290061 | A1* | 9/2023 | Kumar Kamaraju | G06T 7/579 |
| 2024/0144595 | A1* | 5/2024 | Ponjou Tasse | G06V 10/82 |

OTHER PUBLICATIONS

Fu et al., "Joint Texture and Geometry Optimization for RGB-D Reconstruction" https://yanqingan.github.io/docs/cvpr20_joint.pdf; Aug. 5, 2020.

* cited by examiner

EFFICIENT TEXTURE MAPPING OF A 3-D MESH

CROSS-REFERENCE TO RELATED APPLICATIONS

This application claims priority to U.S. Provisional Application Ser. No. 63/318,684, filed on 10 Mar. 2022, the contents of which are hereby incorporated by this reference as if fully stated herein.

TECHNICAL FIELD

The present disclosure relates to the field of photogrammetry, and specifically to efficient selection of keyframes from a video stream for texture mapping a mesh.

BACKGROUND

Devices such as smartphones and tablets are increasingly capable of measuring and/or computing depth data of images or videos they capture, useful for supporting augmented reality (AR) and/or other applications involving 3D spaces. These captured images or video and derived or captured depth data may be processed using various algorithms to detect features in the video, such as planes, surfaces, faces, and other recognizable shapes. The captured depth data and/or detected features, combined in some implementations with data from depth sensors and/or motion information captured from motion sensors such as a MEMS gyroscope and accelerometers, can facilitate software in creating a point cloud in a three-dimensional space. This point cloud enables applications to generate and place virtual objects within a 3D space represented by the captured images and/or video. Furthermore, the point cloud can be used to generate a 3D mesh that effectively is a virtual representation of the space captured in the images or video. The 3D mesh can subsequently be manipulated or otherwise interacted with, apart from or in conjunction with the capturing device.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
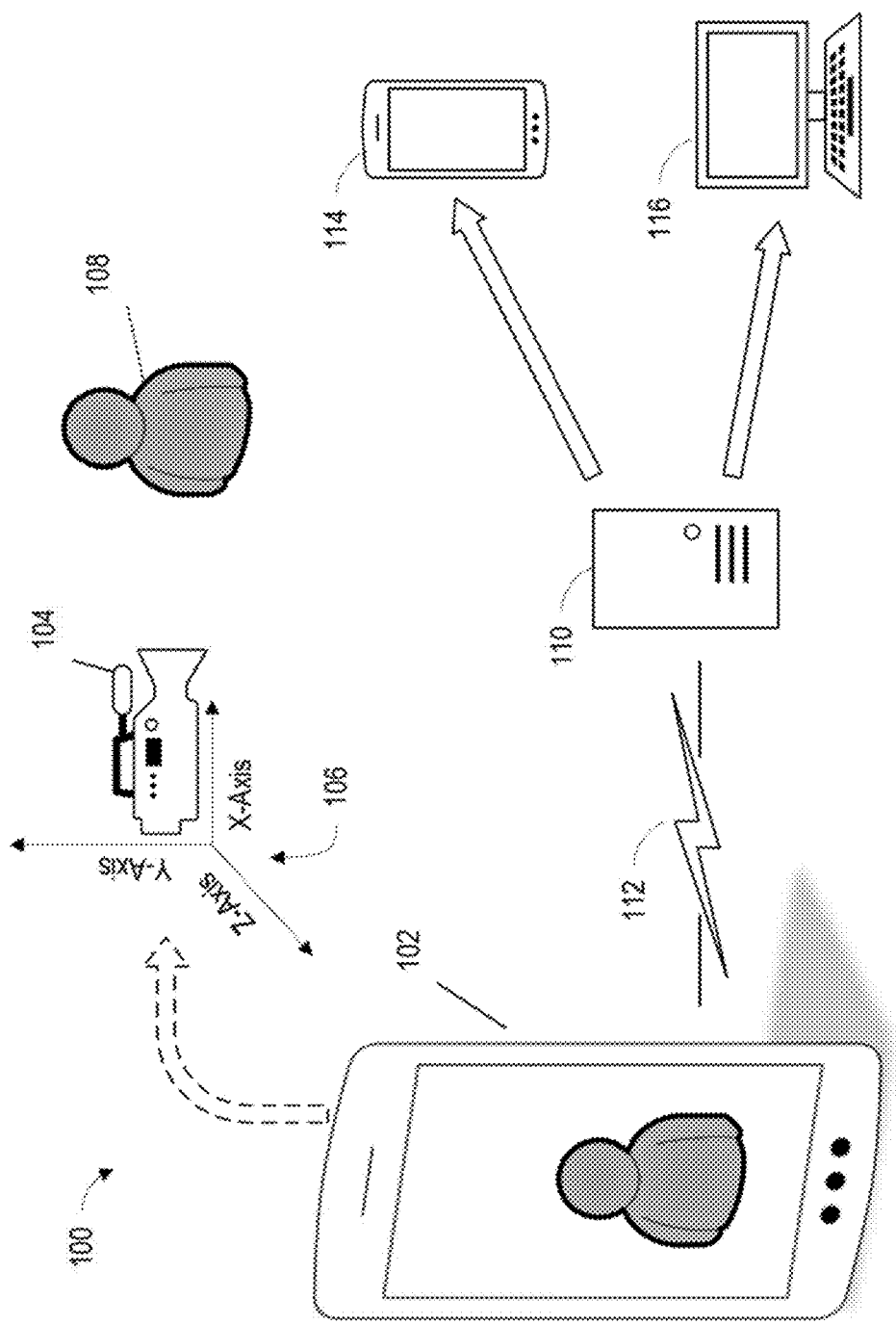
FIG. 1 illustrates a block diagram of the components of a system for capturing an image and corresponding spatial data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Modern computing devices such as smartphones, tablets, laptops, desktops, and other computing platforms can capture and/or transmit spatial data associated with video and audio being captured and transmitted. Spatial data typically includes (but is not limited to) depth data, where various points in an image or video, which may be identified by x-y coordinates, are associated with z coordinates indicating the distance at each point from some reference point to whatever surface or object is imaged at each point. The reference point is typically the capturing device, but may be designated as some other object or point. Depth data may be included as part of a three-dimensional (3D) point cloud, which may be linked or correlated to the image or video giving rise to the spatial data.

Computing systems can derive depth data using various methods, such as photogrammetric techniques, through which three-dimensional (3D) spatial relationships can be ascertained, and/or using sensors specifically configured to directly measure depth. Depending upon the capabilities of a capturing device, depth data may be directly measured or calculated on the fly from captured video, possibly in conjunction with depth sensors and/or spatial position sensors that may be equipped to the capturing device. For example, most modern smartphones are equipped with an array of sensors beyond well-known cameras and microphones. A modern smartphone may also include depth sensor(s), such as a LiDAR imager or rangefinder, and motion sensing, such as multi-axis gyroscopes and accelerometers, to contribute spatial data about camera movements. Combined with image analysis and photogrammetry techniques, as well as techniques such as simultaneous localization and mapping (SLAM) that allow integration of depth, motion, and other spatial data to enable a device to both measure its environment and know its position within the environment, the array of sensors allow for the relatively accurate capture and/or calculation of depth information for a captured space.

Once depth data for a space has been measured or calculated, this information can be used to generate a 3D mesh of the captured space. The 3D mesh is essentially a virtual model of the captured space, which may be textured using images from the video of the captured space. The depth information, as part of a 3D point cloud that represents the captured space, can be used to construct the mesh essentially by "connecting the dots", viz. repeatedly connecting sets of three points of the 3D point cloud together with edges to form a mesh of triangles that approximates the space from which the depth information was obtained. The depth information may be obtained by using a suitably equipped device, as described above, to scan or capture the space. This may be accomplished by panning and/or moving the device with its video camera and any depth scanning sensors active so that the video camera and sensors capture a 360 degree view of the space. Further, the position of the capturing device within the space can be known relative to the depth data via the motion sensors capturing motion data and determined with respect to each successive frame of video simultaneously captured by the device, such as by use of spatial position sensors equipped to the capturing device.

Following generation of the 3D mesh of the captured space, as mentioned above, the video of the captured space may be used to texture the 3D mesh to generate a relatively accurate and realistic view of the captured space. The process of texturing a mesh, at a high level, involves mapping a two-dimensional or flat image to the various triangles that comprise the mesh. It can be thought of as wrapping a piece of paper around a 3D object. There are a number of different techniques by which the actual texture mapping may be carried out, which are generally known by persons skilled in computer graphics. Many graphics processing units (GPUs) have multiple dedicated texture mapping units to carry out texture mapping at a hardware level.

To achieve a relatively realistic 3D model of the captured space, frames from the video of the space are extracted and textured to the 3D mesh, each frame being a two-dimensional image. The frames are correlated to spatial data generated from the frames or sensed with other sensors contemporaneously with the frames, which in turn forms part of the 3D point cloud used to generate the 3D mesh. Correlation may take any suitable form, such as indexing, where spatial data and corresponding frames are indexed with time stamps or other identifiers that allow a given frame to be matched with simultaneously captured spatial data. Correlation may be inherent, such as when the frames themselves are used to generate spatial data, i.e. via photogrammetry. When correlated, each frame can be textured to the portion of the 3D mesh that matches the portion of the captured space depicted in the frame.

Each frame from a video camera useable for texturing may take the form of an RGB image, or RGB/D when correlated with depth data. A typical video camera captures anywhere from 25 or less, to 120 or more frames per second depending on configuration. Consequently, a given section of a captured space may be imaged with multiple nearly identical frames when the camera is held relatively still, as most frames will have significant overlap. As will be understood, frame overlap decreases in inverse proportion to camera movement for a given frame rate, viz. the faster the camera is moved, the less each frame will overlap its predecessor. For portions of a captured space where the camera was held with relatively little motion, however, there may be many captured frames that are nearly identical. When the camera is moved at a modest speed, each successive frame may still share significant overlap with its predecessor, particularly when a high frame rate (60 fps or higher) is used for the capturing camera. Processing every frame in a video stream to determine and extract small non-overlapping portions for incremental texturing of a 3D mesh may be a waste of computing resources and, when a camera is capturing at a high frame rate, may unnecessarily tax the computer system processor or graphics processor. In some cases, the computing system may be unable to texture the 3D mesh in an incremental fashion as the video is captured, and instead will need to perform texturing off-line.

Disclosed embodiments address these limitations by providing systems and methods that select specific keyframes from a video of a captured space for use in texturing a 3D mesh. In embodiments, the keyframes are selected in part on the amount of overlap they have with previously selected keyframes, with a keyframe selected when the amount of overlap is below a predetermined threshold. As a result, video frames that have an overlap that exceeds the predetermined threshold with any previously selected keyframe are ignored. The disclosed selection algorithms generally consume significantly less computing resources than the process of texture mapping, and so can substantially reduce the compute load imposed on the system performing the texture mapping. As will be discussed below, color correction techniques may also be applied to the selected keyframes to provide a more natural looking rendering of the textured 3D mesh.

Further, the 3D point clouds generated by computing devices used to generate 3D meshes may be noisy, viz. they may have spurious depth points that do not correspond with an actual feature within the captured 3D space. This noise may be introduced from a variety of sources, including video artifacts, unusual shadows or shading on a surface that give an appearance of a structure or feature, interference or noise from a range finding sensor, insufficient or poor light quality, sensor glitches, sensor imprecisions, cluttered surfaces, specular highlights, or any other source that may confuse an image processing algorithm used to help compute depth data. As a result, a mesh generated from a noisy 3D point cloud may have artifacts and features that are not actually present in the captured space.

To compensate for a potentially noisy 3D point cloud, mesh generation processes may perform smoothing, averaging, or other suitable noise reduction techniques to the 3D point cloud to eliminate spurious artifacts. However, such noise reduction may inadvertently remove legitimate features that may be relatively small and so appear as noise.

Disclosed embodiments include techniques for identifying curves, which typically indicate the presence of a legitimate feature or structure, within otherwise noisy 3D point clouds, so that such curves can be excepted or protected from any noise reduction process. In some such embodiments, each point in a 3D point cloud may be compared with its neighbors to determine whether it is part of a curve or feature. Noise or spurious points will typically significantly differ from neighboring points, as will be discussed below.

FIG. 1 illustrates an example system 100 that may enable capture of an image or video that includes spatial data, and generate a textured 3D mesh from the image/video and spatial data. System 100 may include a user device 102. In the depicted embodiment of FIG. 1, user device 102 is a smartphone, which may be implemented as a computer device 1500, to be discussed in greater detail below with respect to FIG. 11. Other embodiments may implement device 102 as a variety of different possible devices, such as a computer (desktop or laptop), tablet, two-in-one, hybrid, smart glasses, or any other computing device currently known or later developed that can accept a camera and provide necessary positional information, as will be discussed in greater detail herein. User device 102 further may include a camera 104 and at least one spatial position sensor 106 (depicted by a series of axes), which provides information about the spatial position of camera 104. It will be understood that camera 104 and spatial position sensor 106 may be contained within the body of device 102 or, in other implementations, may be external to but in data communication with device 102. Camera 104 is used to capture the surrounding environment of device 102, and by extension, the user. The environment may be a 3D space such as a room or another defined space, or may be an area or region such as a park or outdoor space, and may include one or more three-dimensional objects 108.

Camera 104 may be any camera that can provide a suitable video stream for the intended purpose of user device 102. Where user device 102 is implemented as a smartphone or tablet, camera 104 may be one or more built-in cameras. In other embodiments, such as where consumer device is a laptop, camera 106 may be built in to the device or a separate, external unit, such as a webcam. A suitable video stream may be a digital video stream, which may be uncompressed or may be compressed in embodiments with some form of video compression, such as AVC-HD, H.264, MPEG-4, or another suitable compression scheme. Camera 104 may be configured to output standard or high-definition video, 4K video, 8K video, or another resolution of video suitable for the intended purpose of camera 104 and user device 102. In other embodiments, camera 104 of user device 102 may comprise multiple cameras or similar sensors, where one or more of the sensors may be configured to directly detect depth points, such as a 3D or stereoscopic camera, LIDAR, or other suitable depth-sensing technology. In such embodiments, a point cloud of any space captured by camera 104 may be able to be at least partially obtained via direct measurement from the depth-sensing technology.

Spatial position sensor(s) 106 may be configured to provide positional information about camera 104, such as camera 104's pan, yaw, and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera, including but not limited to depth sensors 104. In some embodiments, spatial position sensor 106 may comprise multiple sensors, each potentially measuring a different type of spatial position information, e.g. a 3-axis gyroscope to measure angular changes, a 3-axis accelerometer to measure velocity/translational changes, a magnetic compass to measure heading changes, a barometer to measure altitude changes, a GPS sensor to provide positional information, etc. As will be understood, spatial position sensor(s) 106 provide information about the camera's pose, e.g. position and orientation of the camera in three dimensions.

In addition to motion data from spatial position sensor 106, camera intrinsics can include various known or readily determined properties of camera 104, such as focal length, aperture, optical center, angle of view, focal point, etc. For example, knowing the focal point of a camera can allow a rough approximation of distance (depth) to a feature when that feature is in focus. In some possible embodiments, the camera optics may be equipped with an encoder to indicate their focus position, which may be mapped to specific distances. Objects that are then detected as in focus can be understood to be approximately the distance from the camera of the focus position indicated by the encoder. Whether a feature is in focus may be determined by techniques such as edge detection or another contrast-based technique. However, it will be appreciated that, in some instances, only a range of possible depths or distances may be capable of being determined, such as where camera 104 is focused relatively far away from the camera position, and/or the camera 104 utilizes a small aperture (relatively high f-stop, such as f/8, f/11, etc.), so as to offer a large depth of field.

System 100 also includes a central server 110, with which user device 102 is in data communication 112. Central server 110 may act to receive information from user device 102 such as video and depth data, which may be used with process flow 200 or methods 300, 500, 600, 800, and/or 900, discussed below. In some embodiments, user device 102 may handle some or all processing of video and depth information for a captured 3D space, including generation of a metaverse, 3D mesh, and/or layout and estimation of measurements. In other embodiments, depending upon the specifics of a given implementation, central server 110 may carry out some or all processing of the video and depth data to generate a spatial layout and estimation of dimensions of a 3D space captured by the user device 102. User device 102 may either handle a part of the processing, or simply act to acquire data about a 3D space and providing raw or partially processed data to central server 110 for further processing.

Also shown in system 100 are one or more additional user devices 114, 116, which may be smartphones, tablets, laptops, desktops, or other servers. These additional user devices 114, 116 may also be in data communication with central server 110, and so may receive raw or processed data captured by user device 102 and/or a completed layout and estimation of measurements of the 3D space captured by user device 102. User devices 114 and/or 116 may be capable of interaction with a generated 3D mesh or metaverse that may be received from central server 110. Further still, user devices 114, 116 may be enabled to engage in two-way or multi-way interaction with user device 102, either through central server 110 or directly with user device 102, with each device commonly working with a generated 3D mesh and/or metaverse. It should be understood that devices 114 and 116 are merely examples, and are not indicative of the number or type of devices connected to central server 110; a given implementation may have an arbitrary number of devices connected to central server 110, user device 102, or both.

User device 102, as mentioned above, is in data communication 112 with central server 110, along with user devices 114 and 116. Data communication 112 may be implemented using any suitable data communication link technology, which may be wired, wireless, or a combination of both. Example communications technologies are discussed below with respect to FIG. 11.

Figure 2:
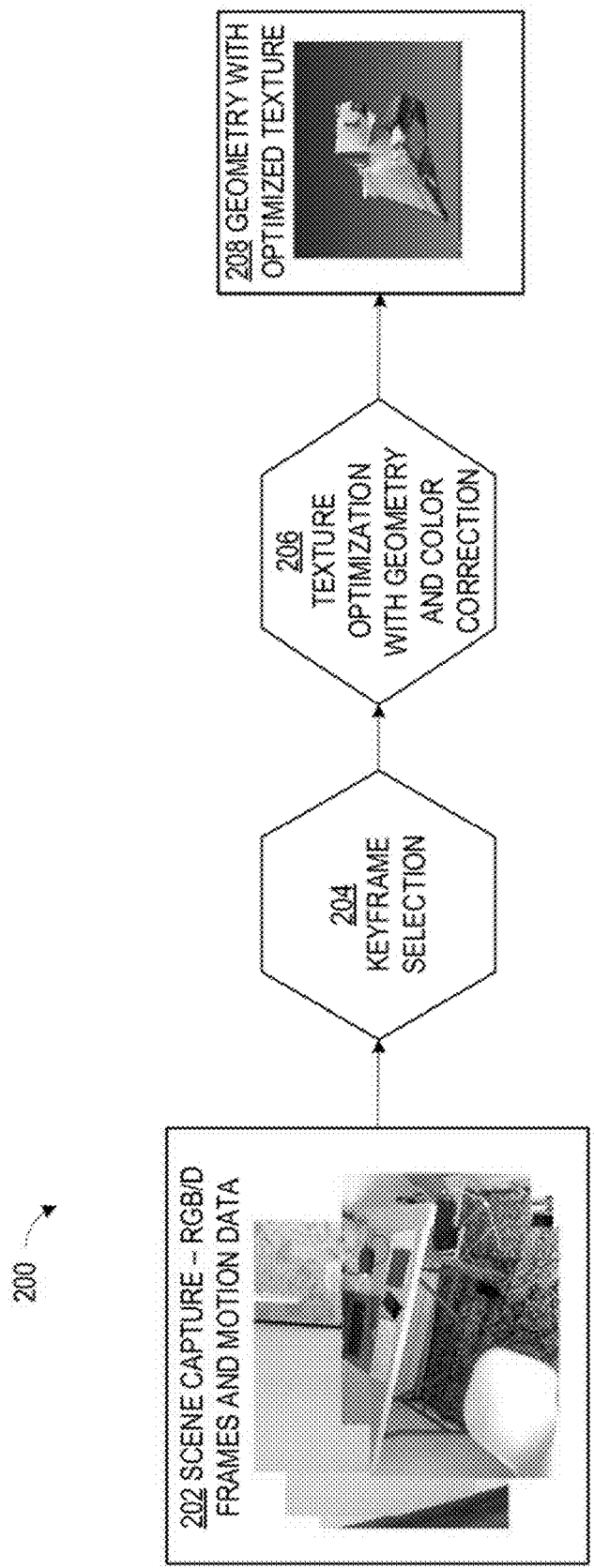
FIG. 2 depicts an example high-level process flow for efficient texturing of a 3D mesh, according to various embodiments.

FIG. 2 depicts an example process flow 200, according to embodiments, for the efficient texture mapping of a 3D mesh. The process flow 200 may be executed simultaneously or near-simultaneously with generation of the 3D mesh to be textured. In some embodiments, process flow 200 may be carried out as part of the generation of the 3D mesh. In other embodiments, process flow 200 may be carried out in phases, with the 3D mesh being completed first and then subsequently textured. Process flow 200 may be carried out by one or more components of a system 100, including central server 110, user device 102, user device 114, and/or user device 116, depending upon the specifics of a given embodiment.

Initially, a scene is captured in block 202 by an input device, such as a camera 104, along with associated motion data, via motion sensors such as spatial position sensor 106. This captured scene, including the video and motion data, may then be used to generate a 3D point cloud or augment a directly measured 3D point cloud, which in turn may be used to create a 3D mesh representation of the 3D space. For augmenting a directly measured 3D point cloud, the captured scene 202 includes imaging captured by a depth-sensitive device, such as a LIDAR sensor or infrared range finder, to allow for direct, and potentially more precise, depth measurements of various points within the scene captured by camera 104. Where direct depth measurements are available, data similar to that available for camera 104 may be used (e.g., camera intrinsics and camera transforms) to process the depth measurements and correlate with the images from camera 104. As mentioned above, the 3D mesh may be generated by the user device 102, the central server 110, another suitably equipped system, or some combination of the foregoing. The creation of a 3D mesh is not illustrated as part of the process flow, although blocks 206 and 208 assume that the 3D mesh has been generated to be textured.

As described above, RGB images may be extracted from frames of the video captured by camera 104, for subsequent use for texturing the 3D mesh generated from the images and depth information. The RGB images may be correlated or associated with depth data, such as part of a 3D point cloud, as indicated by the RGB/D designation. It should be understood that, while the foregoing description and subsequent discussions assume that the captured video, associated frames, and extracted keyframes are in color, e.g. comprised of a plurality of frames that each include an RGB image, other image formats may be utilized. For example, the image data of each frame may instead be expressed using different color systems such as YUV, HSL, CMYK, or another method of expressing color, in alternative embodiments. In still other embodiments, the image information may comprise black and white or greyscale information, with no color information. Further still, other embodiments may utilize a combination of color and greyscale/black and white images.

In block 204 of the depicted embodiment, a keyframe selection process or algorithm is used to select one or more RGB(/D) images from the frames of the captured video. Because the captured video may include a multitude of frames that cover substantially overlapping portions of the captured space, the keyframe selection process in embodiments selects images that lack substantial overlap with other selected keyframes. Minimizing overlap between keyframes allows the amount of texturing that must be computed to fully texture the 3D mesh to likewise be minimized, while maintaining a small degree of overlap helps ensure that the 3D mesh is still fully textured. This reduced set may allow lower powered hardware to perform texture mapping, such as a mobile device or a system that lacks dedicated hardware texture mapping and so must employ software texture mapping. Furthermore, keeping the number of frames required to texture the 3D mesh to a relatively small set can facilitate color correction of the selected keyframes to provide a more seamless texture mapping. Alternatively, where a given region of the 3D space is captured in multiple images, keyframes may be selected that are most in focus. Examples of possible algorithms for keyframe selection and associated considerations will be discussed below with respect to FIGS. 5 and 6.

In block 206 of the depicted embodiment, the generated 3D mesh may be optimized prior to texture mapping. Optimization may include refinement of feature curves to help maximize fidelity to the captured 3D space while mitigating the impact of any potential noise in the 3D point cloud used to generate the 3D mesh. The presence of noise, such as spurious points in the 3D point cloud that are not associated with any actual structure in the 3D space, may result in irregularities in the appearance of the final textured 3D mesh. These irregularities may appear as distortions or warped portions in the mesh texturing. Conversely, the optimization may also include verifying that information that may appear to be noisy is actually representative of structures present within the captured 3D space. For example, protrusions from a surface may give the appearance of noise despite being legitimate information. A noise reduction technique if applied too aggressively may inadvertently remove such protrusions; optimization techniques may identify such protrusions as legitimate and flag so that noise reduction does not delete or ignore the information when the 3D mesh is created. Examples of possible refinement algorithms will be discussed below with respect to FIGS. 8 and 9.

The selected keyframes for texturing may also be color-corrected in some embodiments, to help obtain a more natural and/or realistic texturing appearance. As will be understood by a person skilled in the relevant art, color correction may be done at least between adjacent keyframes to prevent abrupt changes in color and/or lighting in portions of the textured 3D mesh. In some embodiments, all keyframes may additionally or alternatively be color corrected on a more global basis to compensate for possible lighting changes, inconsistent lighting, inconsistent light color temperatures, and/or inconsistencies in camera exposure by the capturing device which may be induced by varying lighting. It will be understood that color correction may involve more than adjusting color balance, but can also include compensating for exposure differences such as differing brightness, contrast, saturation, etc. Color correction techniques will be discussed below in greater detail with respect to FIGS. 3, 5, and 7.

In block 208 of the depicted embodiment, the refined 3D mesh is textured with the color corrected keyframes. This results in a 3D model that reflects the captured 3D space with relative precision. The texture mapping may be performed with dedicated hardware, such as a GPU that includes dedicated texturing units. Alternatively, the texture mapping may be performed using software techniques. In still other embodiments, the texture mapping may be performed using a combination of hardware and software. As discussed above, the texture mapping may be accomplished by the capturing device if suitably equipped, by an offline server, or a combination of both and/or other hardware or systems. Depending on the configuration and/or capabilities of the implementing system or systems, 3D mesh construction and texturing may happen progressively, viz. the 3D model may be built and textured while the capturing device continues to capture the 3D space, with the 3D model being expanded as the capturing device captures new portions of the 3D space.

It should also be understood that, in some embodiments, the model and/or texture mapping may be refined if the capturing device traverses back over portions of the 3D space that were previously captured and rendered into a 3D model. The methods described below may be iteratively performed and compared with previous results to improve 3D model fidelity if an implementing system determines that subsequent captures and/or depth information is more precise than the information used to initially construct the 3D model. Implementing systems may compare any or all aspects of the information about the captured 3D space, including whether subsequently captured 3D point cloud data for a given portion of the space is cleaner or indicates the presence of features that may not have been recognized and inadvertently deleted and/or phantom features not recognized as noise and inadvertently allowed to remain. Likewise, the quality of selected keyframes may be evaluated against subsequent captures to determine if the subsequent capture is possibly in better focus, has less or no motion blur, is better lit, and/or is of better quality than the initial capture in some way. If such frames are identified, the 3D model may be retextured with the higher quality images. Detection of quality differences may be performed using techniques such as edge detection. Such techniques further may be combined with camera data and motion data to determine any possible camera motion.

Still further, if a user of the capturing device moves about the captured 3D space, the capturing device may be brought closer to various aspects of the captured space. At closer distances the capturing device may be able to obtain additional and/or more accurate depth data, as well as more detailed images of various features of the captured space that previously may have either been undetected or detected with relatively low fidelity. Such additional captures may be used to update and further refine the generated 3D model. Thus, as will be understood, the 3D model may incrementally become more accurate as a user of the capturing device wanders about the captured space.

Figure 3:
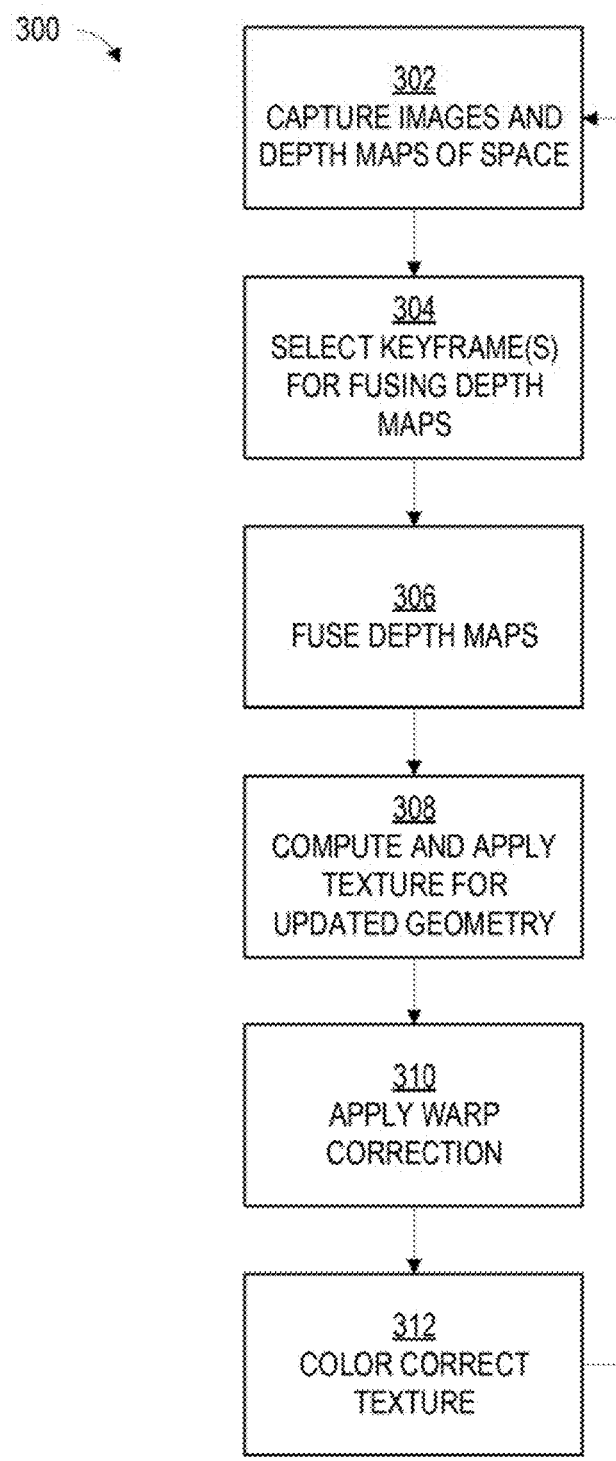
FIG. 3 is a flowchart of the operations of an example method for efficient texturing of a 3D mesh, according to various embodiments.

FIG. 3 depicts an example method 300 for efficient texture mapping of a 3D mesh. Various embodiments may implement only some or all of the operations of method 300, and each of the operations of method 300 may be performed in whole or in part. Some embodiments may add or omit additional operations, or may change the order of operations as may be appropriate for a given implementation. Method 300 may be carried out in whole or in part by one or more components of system 100. Method 300 may be considered at least a partial implementation of process flow 200, described above with respect to FIG. 2.

In operation 302 of the disclosed embodiment, a video of a 3D space is captured along with associated spatial data, as described above with respect to FIG. 1, e.g. spatial data such as a 3D point cloud. The captured video may come from a variety of sources. In some examples, a camera attached to or integrated with a capturing device, such as user device 102 with camera 104, is used to capture the video. In other examples, a different device or devices that are separate from the capturing device may be used to capture the video. The spatial data may come from, in some examples, other sensors as described above with respect to FIG. 1, such as spatial position sensor 106 on a user device 102. In embodiments, the video and spatial data are captured contemporaneously to ensure appropriate association between the spatial data and corresponding video frames.

As discussed above, in embodiments the spatial data includes depth maps, which may be correlated or otherwise associated with each image from the captured video. The depth maps, each comprised of a 3D point cloud, may be generated and/or captured by the capturing device, as described above with respect to FIGS. 1 and 2. When provided by the capturing device, the depth maps may be provided already correlated to their corresponding images from the captured video.

The video and associated spatial data may be captured at a previous time, and stored into an appropriate file format that captures the video along with the raw feature points and motion data. Various operations of method 300 may then be performed on the stored video and associated data in post-processing. Conversely, the video and associated spatial data may be captured and processed according to method 300 in a progressive fashion, e.g., the remaining operations of method 300 are performed on video and spatial data as it is received and while the video and spatial data are still being captured by the capturing device. Disclosed embodiments, by providing an efficient keyframe selection, may facilitate 3D mesh generation and texturing on the fly while video is received.

In operation 304 of the disclosed embodiment, keyframes are selected from the images of the captured video for later use in texturing a 3D mesh generated from the depth maps. In some embodiments, these keyframes may be pulled from the video stream and stored as a set of images. The stored images may be indexed or otherwise tracked so that they can be matched to the locations in a 3D point cloud (discussed below) to which they correspond. In other embodiments, the keyframes may be tracked in a list that provides references into the video stream to their locations, such as timecode or frame number references, in lieu of being extracted and separately stored. The selection of a subset of all captured images as keyframes for texturing, in embodiments, can substantially reduce system overhead compared to approaches that attempt to texture with every captured image. As described above, each frame of the captured video is correlated to a depth map, in the disclosed embodiment. Thus, each selected keyframe has an associated depth map. The depth maps associated with each of the various keyframes collectively may form a 3D point cloud representative of the entirety of the space that is captured in the video stream, and from which the 3D mesh may be generated. Keyframe selection algorithms will be discussed below in greater detail with respect to FIGS. 5 and 6.

In operation 306 of the disclosed embodiment, the depth maps associated with each selected keyframe are fused, to form the aforementioned 3D point cloud of the entire captured space for generation of the 3D mesh. In some embodiments only the depth maps associated with selected keyframes may be fused to form the 3D point cloud. In other embodiments, every image of the captured video may have an associated depth map, and all depth maps from all images may be fused to create a more dense and/or potentially more accurate 3D point cloud. Whether all depth maps or only those depth maps associated with the selected keyframes are fused may depend on the specifics of a given implementation, such as available processor bandwidth and/or storage capacity. As a general principle, reducing the number of depth maps that must be fused likewise reduces the amount of system overhead (e.g. processor, memory, and/or storage utilization) required to create the fused map.

For example, in implementations where the 3D mesh is to be progressively generated as the 3D space is captured, only the depth maps from selected keyframes may be fused. As the capturing device may dwell on a particular section of the captured space for extended periods of time, such an approach may free up processor bandwidth when the capturing device is relatively still, as depth map fusing and mesh generation may be idled until the capturing device moves. In other implementations where processor bandwidth is not a factor, all depth maps from all images may be progressively fused, with the generated 3D mesh being continually refined for a given captured area when the capturing device is held relatively still. Parts of methods 500 and 600, described below with respect to FIGS. 5 and 6, respectively, and directed to selection of keyframes for texturing, may also be employed to select point clouds for fusing. These aspects will be discussed in greater detail below.

In operation 308, in embodiments, the 3D point cloud resulting from the fused depth maps is used to generate the 3D mesh. The geometry of the 3D mesh, as mentioned above, may be created by connecting each point within the 3D point cloud with its neighbors to form a series of triangles. Following generation of the 3D mesh, in some embodiments, the 3D mesh may optimized or otherwise cleaned up to correct for possible noise introduced into the point cloud during capture and/or computation, and/or errors that may be introduced during the fusion process of operation 306, particularly where only the depth maps from the selected keyframes are used to generate the mesh.

Various techniques may be employed to optimize the 3D mesh. In one possible embodiment, the initially generated 3D mesh may be reprocessed and re-meshed to generate a cleaner 3D mesh. An example of such a re-meshing process is described in greater detail below, with respect to FIG. 8. In another possible embodiment, the mesh may be evaluated for noise and the presence of curves, indicative of a structure. Once identified, the depth data indicating the structures can be exempted or otherwise protected from any noise reduction techniques. An example of such an evaluation process is described in greater detail below, with respect to FIG. 9.

Once a cleaned and/or refined mesh has been generated, it may be textured with the various keyframes selected from operation 304, above. As mentioned elsewhere, the texture mapping may be performed using software, hardware, or a combination of both. Hardware texture mapping may be carried out by a graphics processing unit (GPU), which may be equipped with one or more texture mapping units.

In operation 310, the mapped textures are corrected for any warping that may have been introduced during the texture mapping process. Depending upon the type of texture mapping algorithm employed as well as the perspective of the selected keyframe used for the texture, the resulting textured mesh may appear distorted, with the texture having an unnaturally stretched appearance relative to its corresponding 2D image from the video stream. Further, depending on the extent to which the capturing device's perspective changed between the capture a two adjacent selected keyframes, the different perspectives reflected in the keyframes may require either or both keyframes to be transformed to allow a relatively seamless blending of the two different perspectives, to prevent a noticeable seam between keyframes. Various techniques can be employed to detect and refine these warped or distorted areas to achieve a more realistic appearance. In some embodiments, warp correction may be further addressed by retexturing all or a portion of the area with a different keyframe taken from a different perspective, which may become available if the capturing device is moved to a different location and is able to re-capture the 3D space from a different angle.

In operation 312, color correction may be applied to the various keyframes, to further smooth away any potentially visible seams between keyframes. These seams may result from differences in lighting, camera exposure adjustments made automatically as the camera moves about the space in reaction to changing light conditions, lens flares, and/or other factors, which may yield two selected keyframes with different color renderings for a given portion of the captured 3D space. As two sequentially adjacent keyframes may be temporally distant, camera exposure adjustments made gradually over a capture may appear to be abrupt. In some embodiments, the color correction may be applied relative to two adjacent keyframes. In such an approach, overlapping portions of two keyframes may be identified, and then these overlapping regions and proximate areas of the keyframes may be color-matched to minimize any possible visible seams that would otherwise result from abrupt changes in lighting and color. In other embodiments, all keyframes textured to a given mesh may be globally evaluated and corrected to yield a more uniform lighting and coloring of the entire textured mesh. In still other embodiments, some hybrid or combination of local and global color corrections may be performed.

Selection of a suitable approach or approaches to color correction may be determined on a per-session basis. For example, where the lighting conditions of a 3D space are harsh or otherwise significantly vary, only a local adjacent-frame color correction may be applied, with the resulting textured mesh having areas that significantly vary in lighting. A global approach may be unsuitable as it could unfavourably affect contrast and, if some portions are significantly dark, may cause image noise to become apparent if exposure must be boosted. Conversely, where the lighting conditions of a 3D space are relatively consistent, a global approach to correction may be applied, and may yield a more consistent textured mesh than if only local correction is employed. In some implementations, frames may be color-corrected with adjacent neighbors in an initial texturing process, with the textured mesh later globally corrected. Other variations may be applied, depending on the needs of a given embodiment. Color correction will be discussed in greater detail with reference to FIGS. 5 and 7, discussed below.

Depending upon the capabilities of an implementing system or device and/or the needs of a given implementation, method 300 may be performed progressively while the video is being captured, or may be performed on a complete captured video and associated AR data. As suggested above, when performed progressively, some or all of method 300 may be employed to continually refine the captured and textured 3D mesh as new and/or higher quality data and images may be captured. In embodiments, method 300 may be performed by a remote server, by the capturing device, by another device, or by a combination of any of the foregoing. Higher quality may result from changing lighting conditions, improved lighting conditions, closer capture of features yielding greater texture detail (e.g. approaching portions of the captured space with the capturing device so that the portions are captured in greater resolution), or any other factor that can provide improved keyframes and/or depth information.

Figure 4:
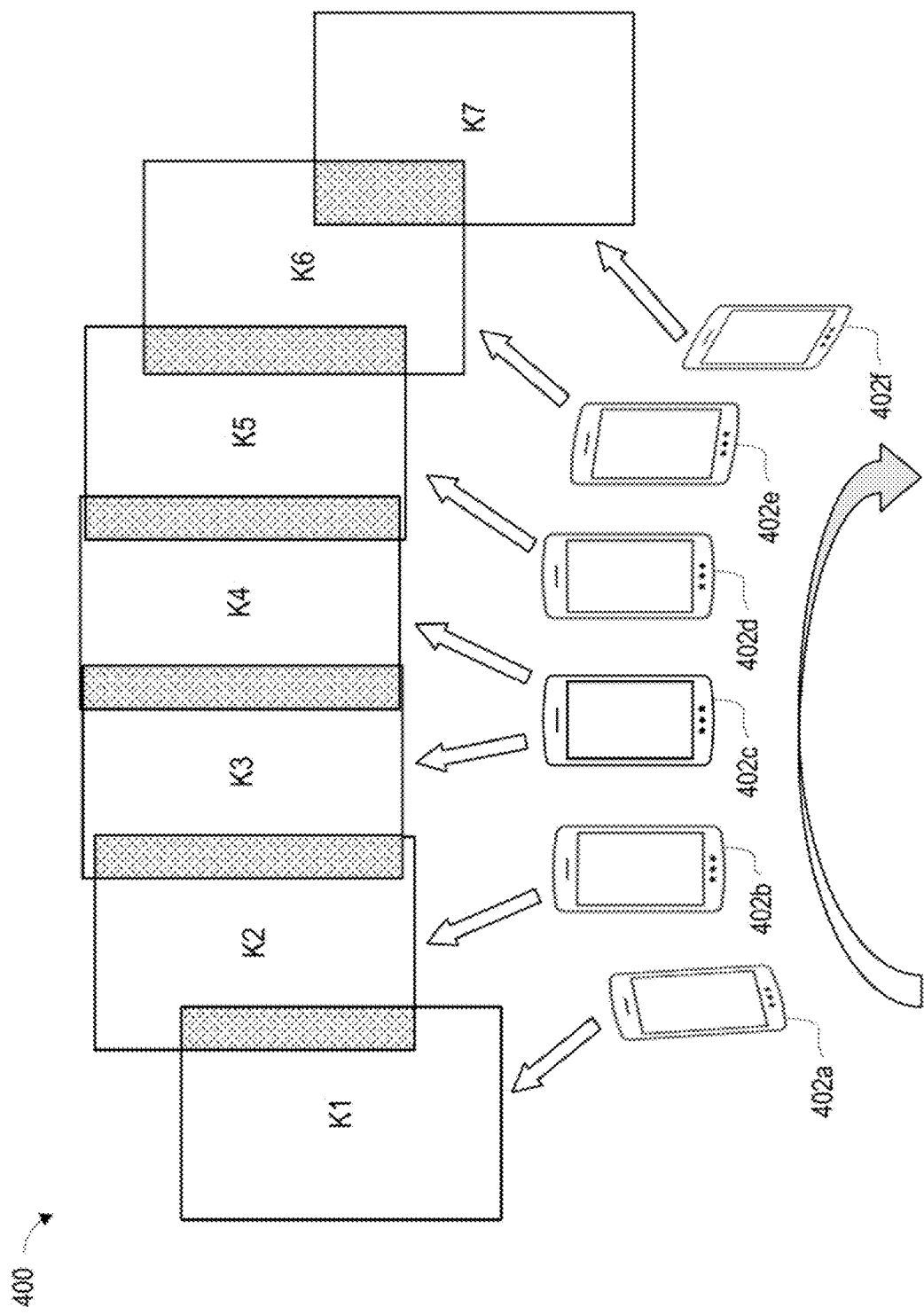
FIG. 4 depicts a series of example keyframes and corresponding capture device positions, according to various embodiments.

FIG. 4 illustrates an example sequence of keyframes K1 to K7 along with corresponding positions of a capturing device 402, illustrated as positions 402a to 402f. As indicated by the curved arrow, the capturing device 402 is panned and rotated from left to right, starting in position 402a and ending in position 402f. Likewise, keyframes K1 to K7 are captured or otherwise tagged in sequential order, K1 to K7. Arrows are drawn between the various positions 402a to 402f of capturing device 402 to corresponding keyframes K1 to K7, indicating an approximate position of the capturing device when each successive keyframe is selected. It should be understood that as FIG. 4 depicts keyframes K1 to K7, these keyframes are only a subset of all frames actually captured by capturing device 402 in the course of capturing a video stream. Keyframes K1 to K7 are extracted or otherwise tagged from the video stream.

Each pair of successive or sequentially adjacent keyframes, e.g. K1-K2, K2-K3, K3-K4, K4-K5, K5-K6, and K6-K7, shares an overlap portion between keyframes, indicated as shaded areas. Also, it can be seen that each keyframe may vary from its adjacent keyframes in both lateral and vertical movement. Thus, for example, keyframes K6 and K7 share an overlap area defined by two corners of the frames, rather than an overlap that runs along all or substantially all of an edge of each keyframe, such as the overlap between keyframes K3 and K4. Overlap thus may be evaluated both laterally and vertically, as the capturing device may likewise be moved both laterally and vertically within the captured space. With respect to embodiments of methods 300, 500, and/or 600, the amount of this overlap area is generally kept below a minimum amount due to the action of the keyframe selection algorithms.

As will be discussed with respect to the discussions of methods 500 and 600, below, in some embodiments keyframe selection includes determining when the amount of overlap between a given frame being captured by capturing device 402 drops below a predetermined amount or threshold when compared to the last captured or tagged keyframe. Thus, as capturing device 402 captures video, the amount of overlap of each incoming video frame is determined relative to the last captured keyframe. When this overlap amount, e.g. the shaded area, decreases below the predetermined threshold, the next keyframe is captured, tagged, or otherwise marked. Overlap between each frame of subsequently captured video and the newly captured keyframe are then determined.

In other embodiments, each frame of captured video may be evaluated for overlap amount with every previously captured or tagged keyframe. Such an approach accommodates the possibility that the capturing device 402 may be moved back over portions of the captured space that were previously imaged or captured, and that may already have selected keyframes. In still other embodiments, the position of each selected keyframe may be stored along with each keyframe. As the position of the capturing device 402 may also be known due to spatial sensors, such as spatial sensors 106, each frame of captured video may be compared with a subset of keyframes, namely, keyframes with position information determined to be proximate to the current position of capturing device 402. In such an embodiment, the comparison of position information can help limit the number of keyframes needed for comparison only to those that are likely to have some amount of overlap with the currently captured video, thus saving processing capacity.

Figure 5:
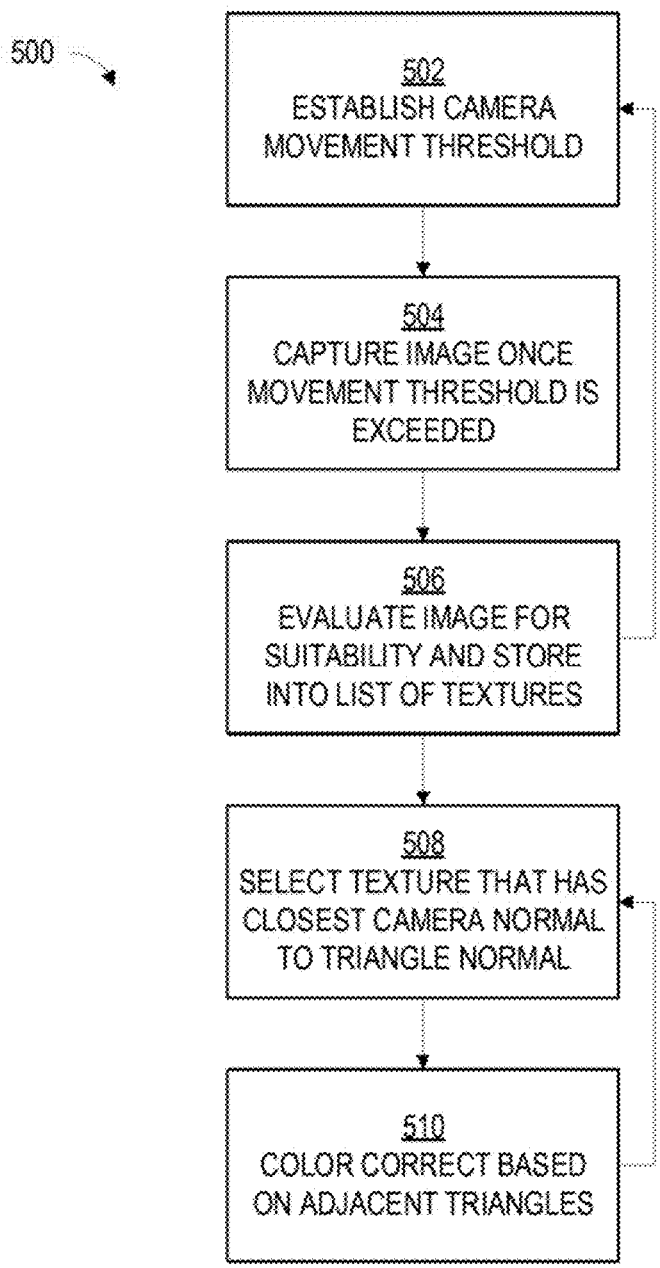
FIG. 5 is a flowchart of the operations of a first example method for selecting keyframes for texturing a 3D mesh, according to various embodiments.

Turning to FIG. 5, a first example method 500 for selecting keyframes from a video stream for texturing a 3D mesh according to some embodiments is depicted. Various embodiments may implement only some or all of the operations of method 500, and each of the operations of method 500 may be performed in whole or in part. Some embodiments may add or omit additional operations, or may change the order of operations as may be appropriate for a given implementation. Method 500 may be carried out in whole or in part by one or more components of system 100. In some embodiments, method 500 may at least partially be embodied or executed as part of operation 304 of method 300.

In operation 502, a threshold for camera movement is established or predetermined. As discussed above with respect to FIG. 1, a capturing device may be equipped with one or more spatial sensors, such as spatial sensors 106, to determine motion of the capturing device, and by extension, a camera or cameras equipped to the device. The spatial sensors may, in embodiments, detect both lateral and rotational movement, providing at least six degrees of freedom (e.g., x, y, z lateral movements, and pitch, roll, and yaw rotational movements). The established threshold for camera movement may be set as some minimum amount of detected movement, either laterally, rotationally, or both. Thus, the threshold would be crossed once the camera's movement exceeds the threshold. For example, in one embodiment the threshold may be set as a minimum rotational change of 15 degrees and/or a movement of three inches in any direction. In another embodiment, the lateral movement may be axis-specific, with one example having a threshold of three inches of movement left, right, up, or down, but having a threshold of ten inches for forward or back movement, e.g. moving towards or away from a structure). It will be understood that similar axis-specific thresholds may be established for rotational movement.

As discussed throughout this disclosure, minimizing the amount of overlap, illustrated as the shaded area between the keyframes depicted in FIG. 4 discussed above, when selecting keyframes for texturing can improve the efficiency of the texturing process by reducing the number of needed keyframes. The threshold selection, as will be understood, may directly affect the degree of overlap, as a larger camera movement (either laterally and/or rotationally) can indicate a comparably smaller amount of overlap between a video frame captured prior to the movement and a video frame captured subsequent to the movement. The selection of threshold or thresholds may depend on specifics of a given camera configuration, and in particular, of the camera's field of view. A camera with a relatively long focal length, and so a relatively narrow field of view, may necessitate a smaller movement threshold when compared to a camera with a shorter focal length, and so a comparatively wide field of view. As will be understood, a given motion for a camera with a wide field of view may result in two images with significant overlap, while the same motion for a camera with a narrow field of view would result in two images with comparatively less overlap. Still further, the selected camera movement threshold may be varied as the capturing device captures the 3D space. If the camera's configuration changes, such as zooming in or out, the corresponding field of view may change, necessitating a change in movement threshold. In still other embodiments, lateral movement may be tracked to determine if the capturing device is physically moved closer to a previously captured surface or object, with such detected movement used to alter the predetermined threshold(s) as appropriate.

In operation 504, an image is captured or otherwise selected from the video from the capturing device once the camera movement threshold has been exceeded, to be a potential or candidate keyframe. The camera movement threshold may not be tied to a specific framerate or be measured between temporally adjacent frames, but rather be continuously monitored across a video capture. A first keyframe may be captured from the video stream when commenced, with subsequent images of the video stream ignored for purposes of method 500 until the movement threshold is exceeded. Once exceeded, a second potential keyframe may be captured from the video stream. Tracking of the camera movement threshold may then be reset, so that the camera's movements are evaluated relative to the position of the camera when the second keyframe was captured. Thus, each successive keyframe is captured when the camera's movement exceeds the predetermined threshold as measured from the previously captured keyframe. In this way, each keyframe is ensured to have an amount of overlap with the previous keyframe that does not exceed a maximum amount, as reflected by the selection of the threshold amount.

In operation 506, the selected or captured potential keyframe is evaluated for suitability to use as a keyframe for texturing. Suitability may be determined by evaluation of overall lighting and/or exposure, as well as detection of any blur which may have resulted either from improper focus or motion. For example, in a low-light setting the capturing device may need to use a longer shutter to achieve a proper exposure, which may result in a greater amount of motion blur when the camera is moved at a given speed compared to a comparable movement in a brightly lit scene. Likewise, poor lighting conditions and/or low-contrast scenes may prevent the capturing device from properly focusing the camera. Candidate keyframes may be evaluated for the presence of blur, such as by using an edge detection algorithm, by using a Fast Fourier Transform (FFT), using another suitable algorithm for blur detection, and/or by comparison to sequentially adjacent keyframes. A threshold may be established in some embodiments for a maximum amount of acceptable blur. If a potential keyframe is determined to have excessive blur, e.g., the amount of blur exceeds an established threshold, the frame may be rejected, and one or more temporally adjacent frames may instead be evaluated for selection. In some embodiments, a temporally adjacent frame may have an overlap with the previous keyframe that exceeds the aforementioned threshold, viz. the selected replacement potential keyframe may have more overlap with the previously keyframe than would otherwise be allowed by the movement threshold established in operation 502.

Likewise, a potential keyframe may be significantly over or underexposed, such as when the capturing device encounters a sudden lighting change (such as a window in full sun coming into view, or a shadowed area), and the camera's auto-exposure system has not had sufficient time to adjust the camera exposure to compensate for the lighting change. In other scenarios, the camera may temporarily glitch, and the resulting image may read out with an improper exposure. As with blur, a threshold for under and/or over-exposure may be established to determine whether a potential keyframe is acceptable. Some images that are over or underexposed by several stops may be able to be corrected to an acceptable exposure that approximately matches sequentially adjacent keyframes without detrimental loss of detail or excessive noise. The threshold may be based on the exposure latitude offered by the capturing device and associated image format. For example, a severely overexposed image may, for some cameras, have unrecoverable areas of white where all detail is lost, while other cameras may provide more of a "shoulder" in exposure where highlights are increasingly compressed, but can still be brought down to recover detail. A given capturing device may also control camera exposure to create such a shoulder, in some implementations. As with an unacceptably blurry image, an unacceptably exposed image may be rejected, and other temporally adjacent frames may instead be selected for evaluation as potential keyframes.

As can be seen in FIG. 5, operations 502 to 506 may iterate repeatedly as a given space is being captured by a capturing device, particularly when generating the 3D mesh and/or texturing will be performed off line, or on a remote server. Operations 502 to 506, in embodiments, may be performed by the capturing device, or may be performed by a remote server that is receiving a video stream from the capturing device. In other embodiments, method 500 may carry out subsequent operations 508 and/or 510 while operations 502 through 506 are being iteratively performed.

Once a potential or candidate keyframe is evaluated to be acceptable, it is added to the list or collection of keyframes to be used for texturing. In operation 508, a keyframe is selected from the list of keyframes for texturing to the 3D mesh that is generated from the 3D point cloud, as described above. As depicted in FIG. 4, each keyframe has a relatively minimal overlap with neighboring keyframes, as a result of method 500 or 600 (discussed below with respect to FIG. 6). Consequently, for a given portion of the 3D mesh, each triangle or polygon is likely covered by only one unique keyframe, which is then used to texture the triangle or polygon. However, some triangles or polygons, or portions thereof, may be covered by at least two keyframes, such as when one or more of the vertexes defining the triangle or polygon are located in an overlap region, e.g. the shaded areas depicted in FIG. 4. For such triangles or polygons, one of the two (or more) keyframes covering the triangle or polygon is selected. In embodiments, the selection may be based on which keyframe has a camera normal that is closest to the normal of the triangle. In embodiments, this may mean the axis of the camera is closest to parallel to the normal of the triangle, or that the keyframe's perspective is closest to directly facing the triangle. The selected keyframe or texture may be aded to a texture atlas.

In operation 510, the textured mesh is color-corrected. Color correction may be done on the texture atlas and/or on the texture mesh. In embodiments, method 500 may iterate over each triangle or polygon of the generated 3D mesh, and compare the color and/or luminance values or histograms with neighboring triangles or polygons, which may be adjacent or proximate to the polygon being evaluated. If the color and/or luminance values of the evaluated polygon deviate beyond a predetermined threshold or thresholds, the color and/or luminance of the evaluated polygon may be adjusted to more closely match its neighbors. Depending on the correction technique employed by a given implementation, neighboring triangles or polygons may also be adjusted towards the values of the evaluated triangle, to provide a relatively smooth transition between portions of the 3D mesh textured from different keyframes.

Alternatively and as mentioned elsewhere, color correction may be performed more globally in some embodiments. For example, the entirety of two adjacent keyframes may be evaluated, with corrections done to one or both frames as a whole. In other such implementations, the overlap area shared by two adjacent keyframes may be evaluated, with portions of the keyframes adjacent to the overlap area being evaluated with progressively less weight as distance from the overlap area increases, viz. color corrections may be performed using a gradient that is weighted most heavily into the overlap region. In still other embodiments, a hybrid approach may be employed, with gradient weighting applied on a per-triangle or polygon level with respect to a given polygon's neighbors. It should be understood that these are just a few possible non-limiting approaches; other techniques for color and/or luminance correction may be applied as appropriate to a given implementation.

As shown in FIG. 5, operations 508 and 510 may be iteratively performed, with color correction carried out following selection of an appropriate keyframe for texturing a given triangle, polygon, or other region of a 3D mesh.

Figure 6:
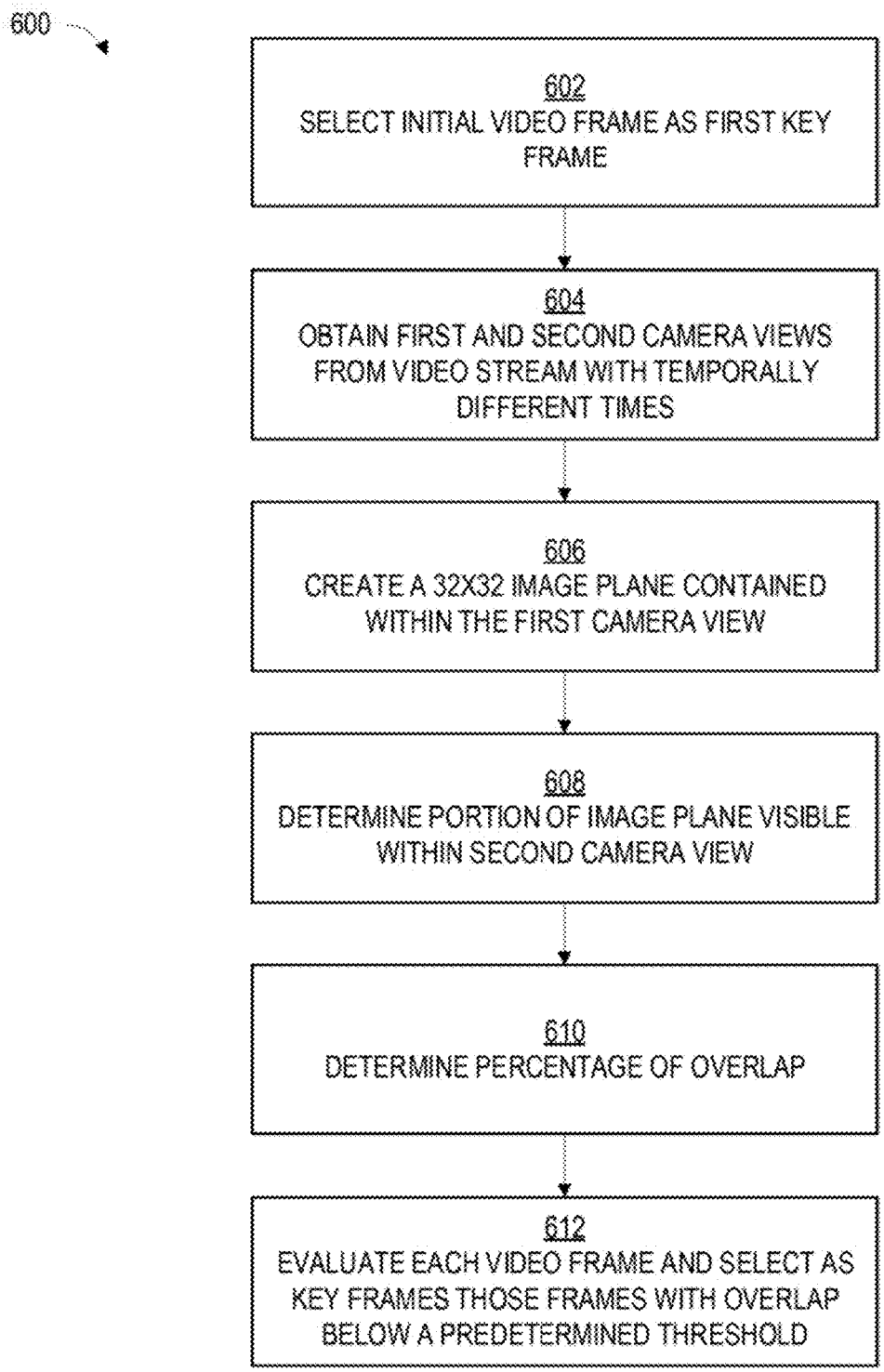
FIG. 6 is a flowchart of the operations of a second example method for selecting keyframes for texturing a 3D mesh, according to various embodiments.

FIG. 6 depicts a second example method 600 for selecting keyframes from a video stream for texturing a 3D mesh, according to some embodiments. Various embodiments may implement only some or all of the operations of method 600, and each of the operations of method 600 may be performed in whole or in part. Some embodiments may add or omit additional operations, or may change the order of operations as may be appropriate for a given implementation. Method 600 may be carried out in whole or in part by one or more components of system 100. As with method 500, in some embodiments method 600 may at least partially be embodied or executed as part of operation 304 of method 300.

In operation 602 of the example method, an initial video frame of the video stream captured by the capturing device is selected as a first key frame, and is added to start the list of selected keyframes. In some embodiments, the initial video frame may first be analyzed for suitability for use as texturing, such as described above with respect to operation 506 of method 500 (FIG. 5). If the frame is unsuitable, the next frame in the sequence of frames from the video stream may be selected and evaluated. This selection and evaluation process may continue on sequentially through the frames of the video stream until a frame is encountered that is suitable for use as texturing, which is then designated as the first keyframe in the list of keyframes.

In operation 604, first and second camera views are obtained from the video stream, in embodiments. The first and second camera views have temporally different times, viz. they are represented by two different frames selected from the video stream, and so inherently are captured at different times. These two views may be represented by 4×4 projection matrices of the camera view, with a first projection matrix $T_{w1}$ for the first camera view, and a second projection matrix $T_{w2}$ for the second camera view. In embodiments, these projection matrices may be constructed by retrieving the camera transforms and intrinsics for the two different frames. This information may be provided or otherwise be obtained from an AR layer or interface running on the capturing device, such as an ARKit session for iOS devices. Each camera view may have associated points with depth information.

In operation 606 of the example embodiment, an image plane is created that is contained within the first camera view. The image plane I may be a 32×32 grid of 3D points that represent or correspond to points on the image plane, in some embodiments. In such embodiments, the x and y values of the grid of I may be interpolated between 0.0 and 32.0. In other embodiments, the size of the image plane grid of I may vary. Larger sized grids can provide greater accuracy, but at the expense of greater computational overhead. Conversely, smaller grid sizes reduce computational load, but at the expense of accuracy. The ranges for the x and y values may likewise be adjusted in consideration of the size of grid of I. The image plane I, in embodiments, is assumed to be fully visible within the first frame corresponding to the first camera view.

In operation 608, the portion of image plane I that is visible in the second camera view, or essentially the overlap between the two camera views, is determined. To determine the visible portion, first I is inverse projected back from the first camera view to the world coordinate space, using the following equation:

$$I_{world} = \text{inverse}(T_{w1}) \times I$$

Next, $I_{world}$ is projected from the world coordinate space to the second camera view:

$$I_2 = T_{w2} \times I$$

This projection may be carried out, in embodiments, with reference to camera motion and pose data.

Following projection, the number of points in $I_2$ that are within the bounds of the image plane I may be determined, e.g. the number of x and y coordinates of $I_2$ that lie within [0.0, 32.0], where z is within a relatively close range, such as a predetermined threshold. Each point that is visible within both camera views within the bounding of image plane I, viz. within an overlap, may have an associated depth value of $z_1$ for their location in the first camera view, and a depth value of $z_2$ for the location in the second camera view that are expected to be within the predetermined threshold. Where z is significantly different for a given point in [0.0, 32.0] between I and $I_2$, it is taken that the point is not within an overlap between camera views.

To make this determination, the depth value of a given point appearing in the second frame were it to appear in the first frame is estimated. This may be carried out as part of projecting image plane I as discussed above. Where the camera has moved between the first and second camera views, z values for a given point in each frame will likely differ. Projecting a given point from the second camera view into the world and then to the first camera view will result in a new depth value of $z_{1-2}$, the estimated depth value of the given point were it to appear in the first camera view, which may still differ from the depth value $z_1$. To determine whether the given point is visible in both views, this new depth value $z_{1-2}$ is subtracted from $z_1$ to yield a delta z value. A threshold for the delta z value may be determined; in embodiments, this value may be set to 2. Points below this threshold value will be considered shared between frames, forming a set of visible points, while points above this threshold value will be discarded as not overlapping. These visible points are a subset of all points in $I_2$ and form a filtered set of points $I_{vis2}$, which are the number of points within the first camera view that are also visible within the second camera view.

The threshold delta z value may be varied. A smaller delta z will provide a greater rejection rate of points as not overlapping, as the estimated depth value $z_{1-2}$ will need to be closer to $z_1$ to be considered a match. Such smaller values can result in a more accurate determination of overlap when camera pose data and depth values are measured relatively more precisely. However, where a capturing device has noisy or otherwise relatively inaccurate sensors, a smaller delta z may result in a significant amount of information being discarded. Consequently, a much greater overlap between selected keyframes than is necessary may result, as a larger overlap will be allowed before the number of points recognized as shared between frames exceeds the threshold to allow a frame to be accepted as a keyframe. Conversely, a larger delta z will provide a greater determination of points as overlapping, as the estimated depth value $z_{1-2}$ can more greatly differ from $z_1$ to be considered a match. Such larger values can allow more efficient keyframe selection with capturing devices that have noisy sensors or otherwise provide a noisy capture, by recognizing points as overlapping even when there is a greater discrepancy between z values obtained in the first camera view and the estimated depth obtained from projecting the second camera views back through the world onto the first camera view. However, where a capturing device can provide relatively accurate depth estimations, a larger delta z value may result in insufficient overlap between selected keyframes (or even lack of overlap) or even failure to select subsequent keyframes. Thus, the delta z value may be selected, in embodiments, with respect to the quality of the capturing device to optimize keyframe selection.

In operation 610, in embodiments, the percentage of overlap between the two camera views is determined from the results of operation 608. With I and $I_{vis2}$ having been computed, the percentage of overlap can be computed with the following equation:

$$\% \text{ overlap} = \frac{|I| - |I_{vis2}|}{|I|}$$

It will be understood by a person skilled in the art that this percentage of overlap between the two camera views is also the percentage of overlap between a frame representing the first camera view with a frame representing the second camera view, e.g. frames from the video stream captured at the different times, as discussed above with respect to operation 604.

Finally, in operation 612, in embodiments the frame corresponding with the second camera view may be selected as a keyframe if the percentage overlap, as computed from operation 610, is below a predetermined threshold.

To build the list of keyframes, method 600 may be iterated over each frame of a video stream that is subsequent to at least the last captured keyframe, thus building the list as the capturing device is moved about a captured space. To compensate for the possibility that the capturing device may be moved back over areas of the captured space that were previously imaged, method 600 may be iterated with a given frame over every keyframe in the keyframe list, e.g. for a given frame f, the percentage overlap is computed between f and every keyframe currently in the keyframe list. While this approach may result in an increasing computing burden as the number of keyframes in the keyframe list increases, the approach of method 600 can be utilized with computing devices that lack the spatial sensors that may be needed to employ method 500. Depending on the capabilities of implementing hardware, a long capture session could reach a point where the keyframe list is sufficiently long such that a capturing device or remote server would be unable to determine keyframes in real time. Instead, the device or remote server would need to process through the completed video stream once capture is complete. For devices that can determine their location within a captured space, in such embodiments a hybrid approach may be employed where only keyframes that are within proximity to the capturing device's current orientation and direction are evaluated, thus potentially allowing real-time keyframe selection.

Figure 7:
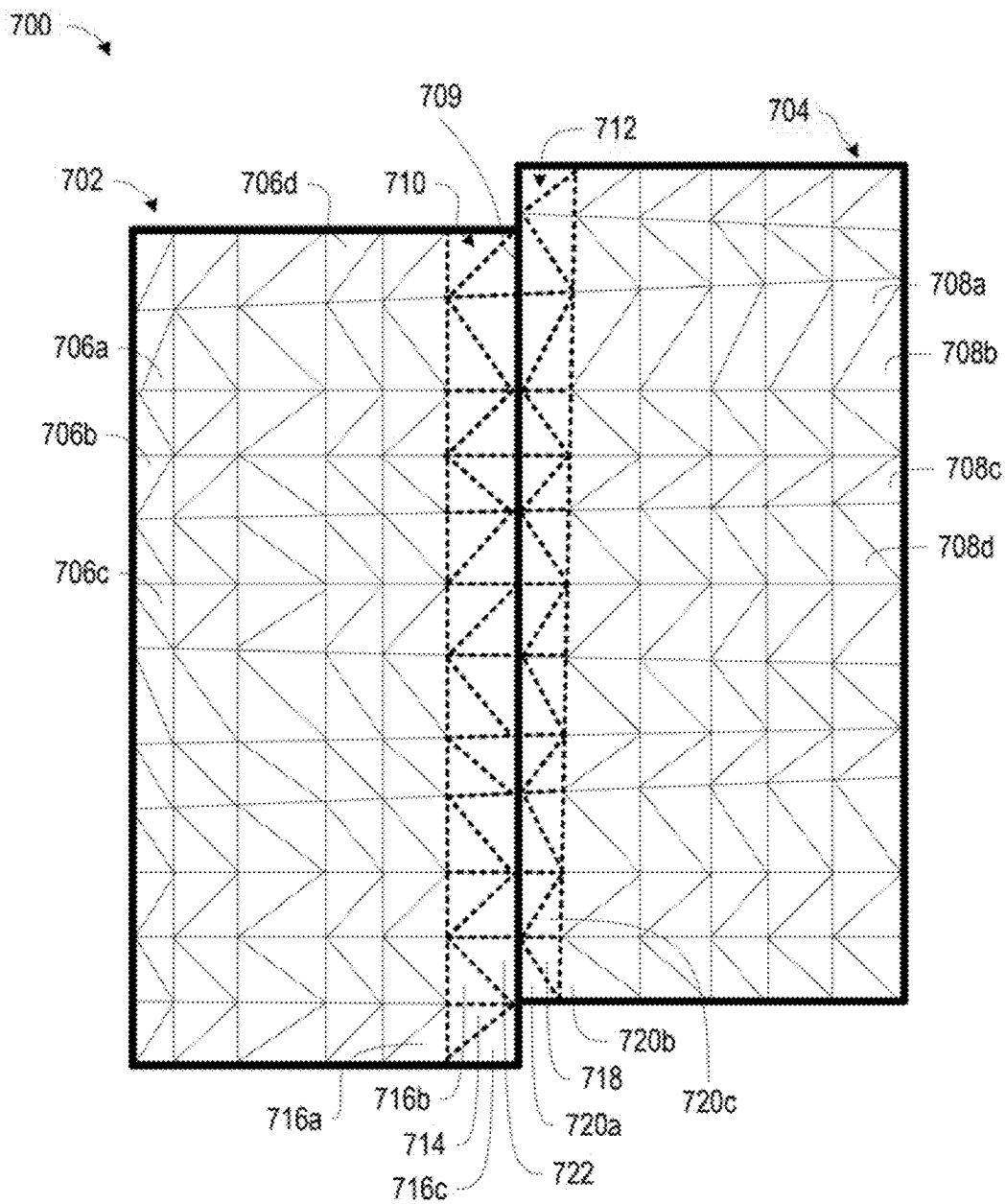
FIG. 7 depicts a section of 3D mesh, illustrating two adjacent textured keyframes and a border region between the keyframes for color correction, according to various embodiments.

FIG. 7 illustrates two adjacent keyframes 702 and 704 as projected and textured onto a 3D mesh, for color correction of the texture. The 3D mesh is comprised of a plurality of triangles, illustrated as triangles 706a to 706d for keyframe 702, and triangles 708a to 708d for keyframe 704. The keyframes 702 and 704 abut where the dark bold lines meet at seam 709, which is bracketed on either side by regions 710 and 712, illustrated with the mesh rendered in dotted lines. Within regions 710 and 712, color correction may be desired to ensure a relatively smooth transition between keyframes 702 and 704, where seam 709 is minimally or not noticeable.

Example triangles 714 and 718, in regions 710 and 712, respectively, may be color corrected to achieve a seamless transition between textured keyframes 702 and 704. For a given triangle, color correction may be performed based on adjacent triangles. Triangle 714, for example, may be color corrected by evaluation and/or comparison with triangles 716a, 716b, and 716c, for example; similarly, triangle 718 may be color corrected by evaluation and/or comparison with triangles 720a, 720b, and 720c. The indication of the three triangles surrounding triangles 714 and 718 are for illustration only, and should not be understood to be limiting. It should be understood that triangles 714 and 718 may be compared to more or fewer surrounding triangles than indicated. Furthermore, triangles proximate to the seam 709 may be evaluated and color corrected relative to adjacent triangles that are textured with the adjacent keyframe. For example, triangle 722, textured with keyframe 702, is adjacent to both triangle 716b, also textured with keyframe 702, and triangle 720a, which is textured with keyframe 704. Triangle 722 may be color-corrected with respect to both triangles 716b and 720a, and likewise triangle 720a may be color corrected with respect to triangles 722 and 718. By color correcting triangles with reference to triangles located across seam 709, the appearance of seam 709 can be minimized or possibly eliminated.

Any suitable comparison process now known or later developed may be employed for color correction. As a non-limiting example, the color values or histogram of a given triangle such as triangle 714 or 718 may be compared to the color values or histogram of its adjacent triangles, and the values adjusted to more closely match the adjacent triangles. In some embodiments, the values of the adjacent triangles may be adjusted somewhat to more closely match the triangle being evaluated. Depending upon the specifics of a given implementation, the adjacent triangles may be adjusted less drastically than adjustments made to the triangle being evaluated. In some embodiments, the aggressiveness of adjustments may taper down as a triangle's distance from a seam increases. Thus, triangles that are more proximate to a seam are more aggressively corrected, to aid in smoothing the visual texture transition between keyframes at the seam. In other words, a gradient in terms of correction weighting may be employed around each seam between keyframes.

Finally, it should be appreciated that the presence of features as reflected in a mesh may result in abrupt color changes that should be preserved. For example, a window or door may present an abrupt change of color from the surrounding wall. Where the edge of a window or door is proximate to or coincides with a seam between keyframes, color correction may inadvertently smear or blur the door's edge. In such situations, the presence of features indicated within the 3D point cloud may be used to determine whether a change in color is the result of differently exposed keyframes or due to distinguishing features in the captured environment. Alternatively or additionally, semantic segmentation and/or any other suitable technique(s) may be used to identify the presence of features or structures that may present abrupt color shifts, and determine whether such features are proximate to a keyframe seam.

Figure 8:
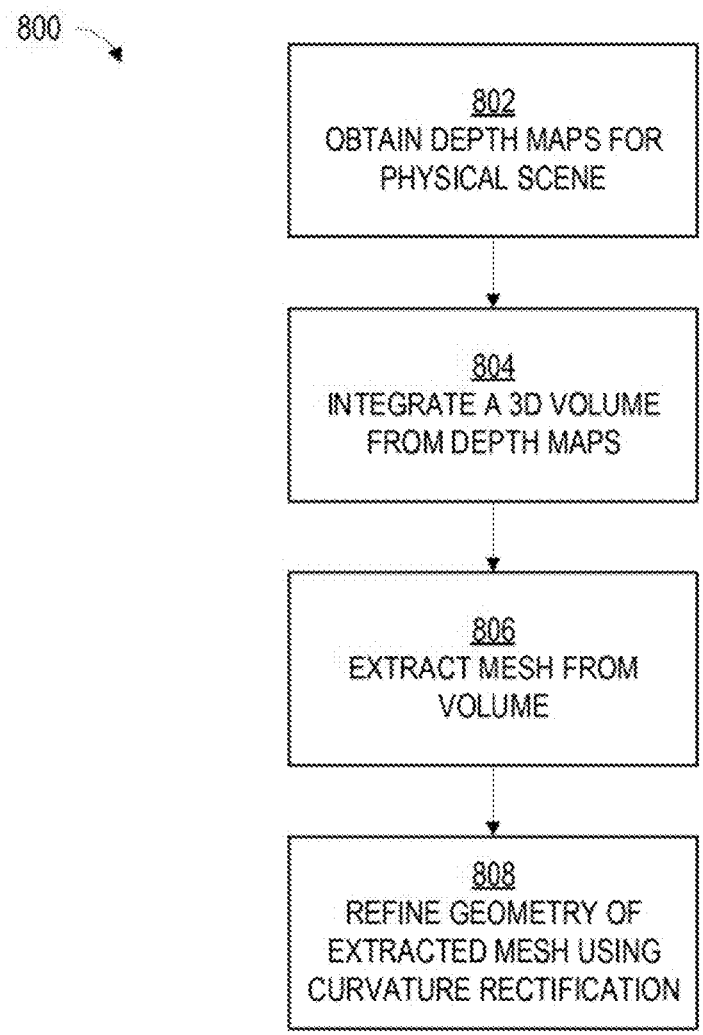
FIG. 8 is a flowchart of the operations of an example method for refining the geometry of a 3D mesh, according to various embodiments.

FIG. 8 depicts an example method 800 for mesh refinement or remeshing, according to some embodiments. Various embodiments may implement only some or all of the operations of method 800, and each of the operations of method 800 may be performed in whole or in part. Some embodiments may add or omit additional operations, or may change the order of operations as may be appropriate for a given implementation. Method 800 may be carried out in whole or in part by one or more components of system 100.

In operation 802 of the example method, depth maps for the captured scene are obtained. These depth maps may be obtained as discussed above with respect to FIGS. 2 and 3, as in most embodiments the depth maps are used to construct the 3D mesh that is textured with the keyframes. In some embodiments, an initial 3D mesh of the captured space (which may have been rendered from raw depth data provided by the capturing device) is collected along with camera pose information and possibly camera intrinsics for the duration of the capture session. Some or all of this information may be provided by a software layer or interface running on the capturing device, such as an augmented reality layer or interface. Once the capture session is complete, the depth maps can be rendered from the initial 3D mesh and camera pose information. In such implementations, processing may typically take place offline, and may be performed by the capturing device, a remote server, or some combination of systems. In other embodiments, an augmented reality layer or interface on the capturing device may provide the depth maps in real time or approximately real time, allowing use during a live or otherwise ongoing capture session. In such embodiments, an initial 3D mesh may not need to be generated from the depth maps obtained from the capturing device.

In operation 804 of the example method, the depth maps are used to integrate a 3D volume. In embodiments, an algorithm such as a truncated signed distance function (TSDF) fusion, which fuses the depth maps with the camera pose information and/or camera intrinsics. In other embodiments, any suitable algorithm now known or later developed may be employed that results in creation of the 3D volume, depending on the needs of a given implementation.

In operation 806 of the example method, a mesh, such as a 3D mesh, is extracted out of the 3D volume from operation 804. In embodiments, an algorithm such as marching cubes may be used to extract the data necessary to create the mesh. In other embodiments, any suitable algorithm now know or later developed may be employed, depending on the needs of a given implementation.

In operation 808 of the example method, the regenerated 3D mesh from operation 806 may be further refined, such as using a curvature rectification process. An example curvature rectification process that may be employed in some embodiments is described below with respect to FIG. 9. Any other suitable process or processes now known or later developed for mesh refinement may be employed, in various embodiments, in addition to or alternatively to curvature rectification.

Figure 9:
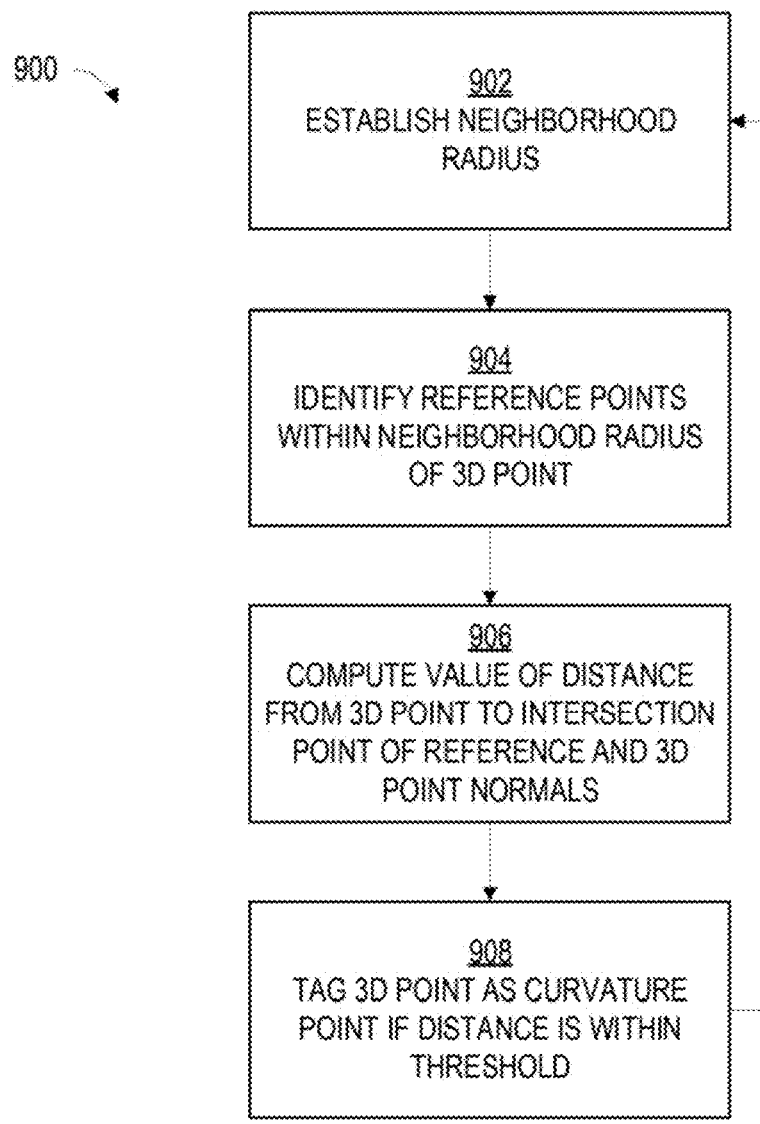
FIG. 9 is a flowchart of the operations of an example method for recognizing features from a noisy point cloud or mesh, according to various embodiments.

FIG. 9 depicts an example method 900 for identifying curves and other features from a noisy 3D point cloud or 3D mesh. Various embodiments may implement only some or all of the operations of method 900, and each of the operations of method 900 may be performed in whole or in part. Some embodiments may add or omit additional operations, or may change the order of operations as may be appropriate for a given implementation. Method 900 may be carried out in whole or in part by one or more components of system 100.

In operation 902 of the example method, for each point in the 3D point cloud or 3D mesh, a neighborhood radius is established. This neighborhood radius, in embodiments, determines the constellation of neighboring points within the 3D point cloud or 3D mesh against which a selected point, referred to as a query point, will be compared. With a 3D mesh, the radius may, in embodiments, be viewed as a sphere centered around the query point. The selection of the radius may be tuned, as needed by a given embodiment, to achieve a greater or lesser amount of smoothing through method 900. A larger radius will, compared to a smaller radius, result in more reference points being identified for a given query point, and so a greater number of comparisons in subsequent operations. Where a point cloud is relatively noisy, a larger radius may allow for better rejection of spurious points, at the risk of inadvertent removal of abrupt or relatively small, sharp features that may be legitimate but appear as noise. Conversely, a smaller radius may allow for better preservation of abrupt details, but at the expense of failing to identify a greater number of spurious points, thus resulting in some amount of noise being present in the refined mesh.

In operation 904, reference points against which the query point will be compared are identified using the neighborhood radius, in embodiments. Any points within the radius may be taken as reference points, with all other points lying outside the radius otherwise ignored. With the radius defining a sphere on a 3D mesh, the reference points are points that lie within the spherical volume defined by the radius.

In operation 906, normals are projected through the query point and each identified reference point. The value of the distance from the query point to the point where the normals through the query point and through each identified reference point intersect (the intersection distance) is calculated, in embodiments. It should be understood that the intersection distance is computed for each query point—reference point pair.

In operation 908, the query point is tagged as a curvature point if the distance value is within a predetermined threshold. In some embodiments, the query point is only tagged as a curvature point if at least a minimum number of reference points has an intersection distance value that is within the predetermined threshold. Employing a minimum number of reference points can allow spurious or otherwise noisy points to be excluded, as such spurious points would be unlikely to have a significant number of reference points with intersection points within the predetermined threshold. The predetermined threshold may vary depending upon the curvature of which the query point is a part. Where the curvature is gentle, the predetermined threshold may be set relatively distant, as normals converge at increasingly greater distances as a surface approaches a flat plane, with a perfectly flat plane being defined as a surface where all normals are parallel, and never converge. By varying the predetermined threshold, spurious or noisy points can be identified across a range of curves with widely varying radii.

In some embodiments, a weighting may be applied to each query point—reference point pair, which may be based on the distance between the query point and the reference point. The weighting may be Gaussian, or another weighting method suitable for a given implementation. Furthermore, the Gaussian weighting may be based on the distance between the query point to a given reference point and/or based on the dot product of the normals between the query point and the given reference point. The weighting may be used in conjunction with a minimum number or reference points or in lieu of a minimum number, to determine whether a query point being evaluated should be tagged as a curvature point. In embodiments, a query point—reference point pair that has a greater distance from the query point may be accorded less weight in determining whether the query point should be tagged as a curvature point. Thus, a query point may be designated a curvature point if the reference points most proximate to the query point have intersections that are within the predetermined threshold, even if a number of the more distant reference points have intersections that exceed the predetermined threshold. Furthermore, it should be understood that an intersection point may lie on either side of a curve depending on whether the curve is concave or convex relative to the position of the capturing device. This will be explained in more detail below, with respect to FIGS. 10A and 10B.

In some embodiments, the minimum number of reference points within the predetermined threshold may be varied based on the applied weighting. Thus, query points may be tagged as curvature points if they have a fewer number of proximate reference points with distances within the predetermined threshold, or if they have a greater number of more distant reference points within the predetermined threshold. For example, a query point with ten identified surrounding reference points may be designated as a curvature point if only two or three of the most proximate reference points have intersection distances within the predetermined threshold. In contrast, the query point may require at least five reference points with intersection distances within the predetermined threshold to be tagged a curvature point, when the reference points are near the edge of the neighborhood radius. The minimum number of points thus may be scaled or adjusted based on the Gaussian weighting of each evaluated query point—reference point pair.

As illustrated in FIG. 9, method 900 may iterate through all points within the point cloud. Thus, for a given set of reference points within a radius of a query point, method 900 would be repeated for each reference point, with each reference point becoming the query point. With each new query point, the radius would be re-centered around the new query point, with a new set of reference points being identified in operation 904. Furthermore, in some embodiments, evaluation of the underlying images, such as the keyframe or keyframes covering the portion of the 3D point cloud being evaluated, may allow identification of points that may correspond to sharp or abrupt features. Such evaluation can allow thresholds and the neighborhood radius to be locally adjusted to preserve features. Images can be evaluated using any suitable technique, including edge detection, object detection, semantic segmentation, analysis by artificial neural net, and/or any other suitable technique now known or later developed.

Figure 10B:
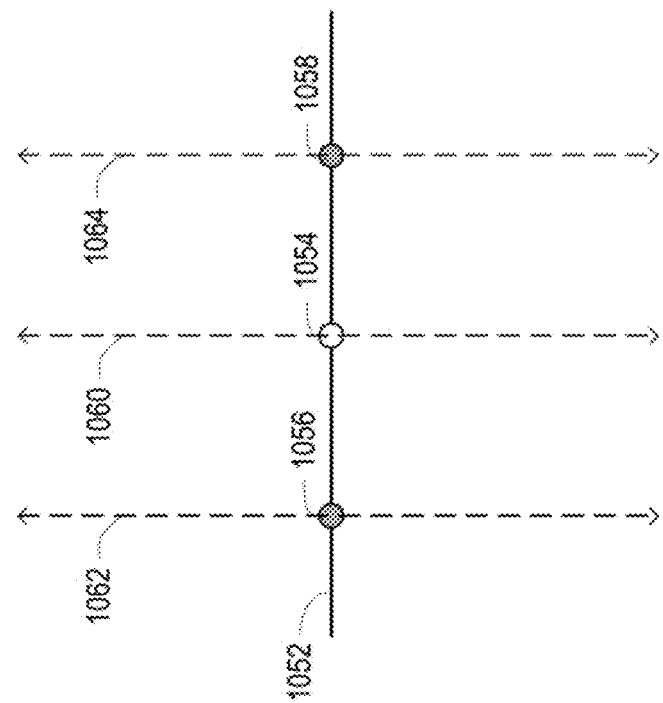
FIG. 10B illustrates the lack of convergence of normals projected through points located on a relatively straight line, according to various embodiments.
Figure 10A:
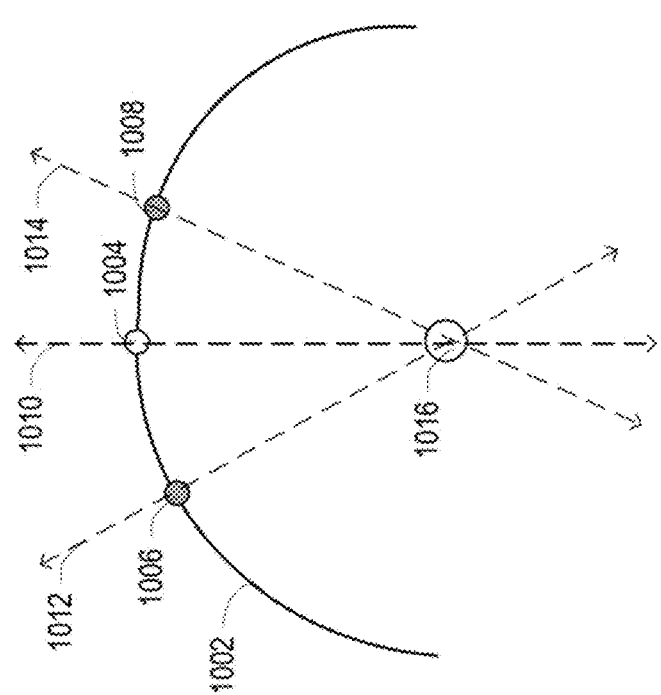
FIG. 10A illustrates the convergence of normals projected through points located on a curve, according to various embodiments.

FIGS. 10A and 10B illustrate the difference between normals projected through points on a curve as compared to normals projected through points on a straight line. As described with respect to method 900, the points may be points of a 3D point cloud or mesh, with the curve or line defined by connecting the points. It should be understood that FIGS. 10A and 10B are 2D representations for ease of depiction; the various points may be part of a 3D mesh, with surface formed by connecting points in groups of three to form the triangles of a 3D mesh. Examples of such connections are illustrated in FIG. 7, described above.

Referring to FIG. 10A, a curve 1002 is shown, along which three points are located: query point 1004, and reference points 1006 and 1008. Through each point a normal is projected, with normal 1010 projected through query point 1004, normal 1012 projected through reference point 1006, and normal 1014 projected through reference point 1008. The two reference point normals 1012 and 1014 approximately intersect with query point normal 101 at an intersection point 1016. For purposes of method 900 (FIG. 9, above), the distance used for evaluation of whether the query point 1004 should be designated a curvature point is the distance between intersection point 1016 and query point 1004. Furthermore, it should be appreciated that FIG. 10A depicts the curve 1002 without reference to a camera position. Thus, intersection point 1016 may be above the curve 1002 towards a capturing device where the curve 1002 is concave relative to the capturing device, and may be below the curve 1002 (hidden under the curve surface), away from the capturing device, when the curve 1002 is convex.

Referring to FIG. 10B, a curve 1052 that is substantially flat is illustrated. As with FIG. 10A, three points are illustrated along the curve 1052: query point 1054, and reference points 1056 and 1058. Normal 1060 is projected through query point 1054, normal 1062 is projected through reference point 1056, and normal 1064 is projected through reference point 1058. As curve 1052 is substantially flat, the normals 1060, 1062, and 1064 are shown substantially parallel, and not intersecting. For a given section of curve that is relatively consistent, it will be understood that all normals will intersect at approximately the same point, defined by the general radius of the curve section. The greater the radius for a given section, the greater the distance from the query point to the intersection point will be. It will be appreciated that the distance between the intersection point and the query point may be used to determine whether a given section of curve is relative flat, or more sharply or acutely curved.

Figure 11:
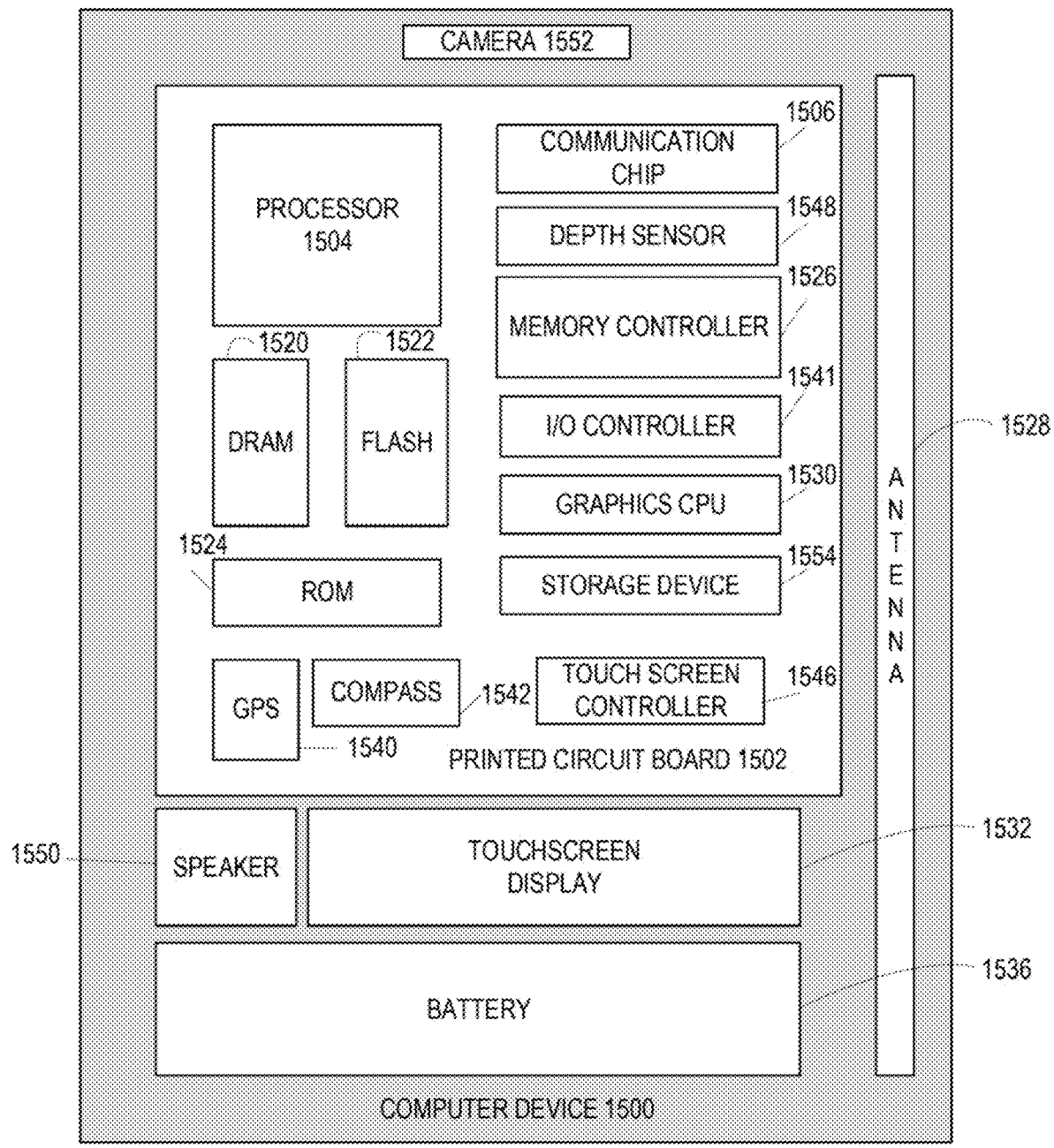
FIG. 11 is a block diagram of an example computer that can be used to implement some or all of the components of the disclosed systems and methods, according to various embodiments.

FIG. 11 illustrates an example computer device 1500 that may be employed by the apparatuses and/or methods described herein, in accordance with various embodiments. As shown, computer device 1500 may include a number of components, such as one or more processor(s) 1504 (one shown) and at least one communication chip 1506. In various embodiments, one or more processor(s) 1504 each may include one or more processor cores. In various embodiments, the one or more processor(s) 1504 may include hardware accelerators to complement the one or more processor cores. In various embodiments, the at least one communication chip 1506 may be physically and electrically coupled to the one or more processor(s) 1504. In further implementations, the communication chip 1506 may be part of the one or more processor(s) 1504. In various embodiments, computer device 1500 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computer device 1500 may include other components that may be physically and electrically coupled to the PCB 1502. These other components may include, but are not limited to, memory controller 1526, volatile memory (e.g., dynamic random access memory (DRAM) 1520), non-volatile memory such as read only memory (ROM) 1524, flash memory 1522, storage device 1554 (e.g., a hard-disk drive (HDD)), an I/O controller 1541, a digital signal processor (not shown), a crypto processor (not shown), a graphics processor 1530, one or more antennae 1528, a display, a touch screen display 1532, a touch screen controller 1546, a battery 1536, an audio codec (not shown), a video codec (not shown), a global positioning system (GPS) device 1540, a compass 1542, an accelerometer (not shown), a gyroscope (not shown), a depth sensor 1548, a speaker 1550, a camera 1552, and a mass storage device (such as hard disk drive, a solid state drive, compact disk (CD), digital versatile disk (DVD)) (not shown), and so forth.

In some embodiments, the one or more processor(s) 1504, flash memory 1522, and/or storage device 1554 may include associated firmware (not shown) storing programming instructions configured to enable computer device 1500, in response to execution of the programming instructions by one or more processor(s) 1504, to practice all or selected aspects of process flow 200, method 300, method 500, method 600, method 800, or method 900, described herein. In various embodiments, these aspects may additionally or alternatively be implemented using hardware separate from the one or more processor(s) 1504, flash memory 1522, or storage device 1554.

The communication chips 1506 may enable wired and/or wireless communications for the transfer of data to and from the computer device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond.

The computer device 1500 may include a plurality of communication chips 1506. For instance, a first communication chip 1506 may be dedicated to shorter range wireless communications such as Wi-Fi and Bluetooth, and a second communication chip 1506 may be dedicated to longer range wireless communications such as GPS, EDGE, GPRS, CDMA, WiMAX, LTE, Ev-DO, and others.

In various implementations, the computer device 1500 may be a laptop, a netbook, a notebook, an ultrabook, a smartphone, a computer tablet, a personal digital assistant (PDA), a desktop computer, smart glasses, or a server. In further implementations, the computer device 1500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 12:
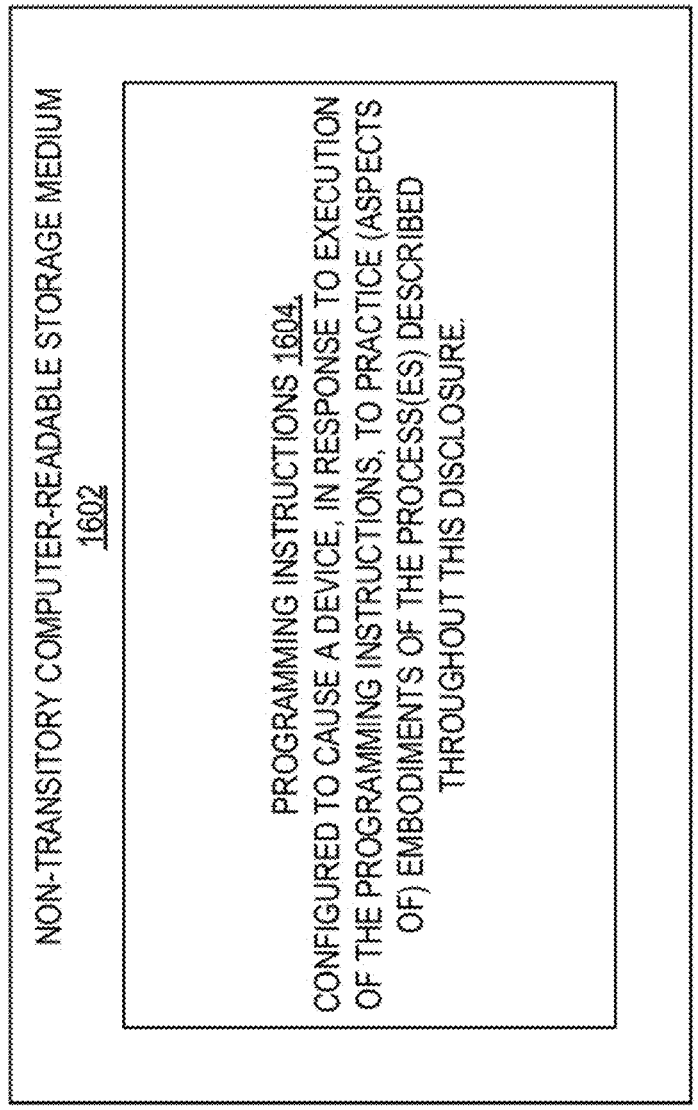
FIG. 12 is a block diagram of a computer-readable storage medium that can be used to implement some of the components of the system or methods disclosed herein, according to various embodiments.

FIG. 12 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1602 may include a number of programming instructions 1604. Programming instructions 1604 may be configured to enable a device, e.g., computer 1500, in response to execution of the programming instructions, to implement (aspects of) process flow 200, method 300, method 500, method 600, method 800, or method 900, described above. In alternate embodiments, programming instructions 1604 may be disposed on multiple computer-readable non-transitory storage media 1602 instead. In still other embodiments, programming instructions 1604 may be disposed on computer-readable transitory storage media 1602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non- exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for creating and texturing a 3D mesh as it is captured, comprising:
    capturing, with a capturing device, a video of a three-dimensional space by moving the capturing device about the space, the video comprised of a plurality of images;
    capturing, with motion sensors, motion data of the capturing device as it is moved about the space simultaneously with the captured video and obtaining depth data;
    generating a 3D mesh of the space from the video and the motion data;
    selecting, while the video and motion data are being captured, a plurality of keyframes from the plurality of images, each of the plurality of keyframes having an overlap with other individuals of the plurality of keyframes that is less than a predetermined threshold;
    texturing, while the video and motion data are being captured, the 3D mesh with the plurality of keyframes;
    detecting a warped or distorted area in the 3D mesh; and
    retexturing all or a portion of the warped or distorted area with a different keyframe taken from a different perspective.

2. The method of claim 1, wherein selecting the plurality of keyframes and texturing the 3D mesh is progressively carried out while the video of the three-dimensional space is being captured.

3. The method of claim 2, further comprising refining the texturing as the capturing device recaptures previously textured areas.

4. The method of claim 1, further comprising enhancing a geometry of the 3D mesh.

5. The method of claim 4, wherein enhancing the geometry of the 3D mesh comprises:
    capturing a plurality of 3D points; and
    for each of the plurality of 3D points:
        identifying one or more neighboring points within the 3D point's neighborhood, the neighborhood defined as a predetermined radius around the 3D point;
        computing an intersection point of a normal of the 3D point and each neighboring point; and
        tagging the 3D point as a curvature point when a distance between the 3D point and the intersection point is within a predetermined threshold; and
    refining the 3D mesh to reflect a presence of the curvature points.

6. The method of claim 1, wherein selecting the plurality of keyframes comprises:
    determining from the motion data when the capturing device crosses a predetermined movement threshold;
    capturing, when the capturing device crosses the movement threshold, an image from the video; and
    determining whether the captured image is suitable for texturing.

7. The method of claim 1, wherein selecting the plurality of keyframes comprises:
    selecting for an initial keyframe a first image from the plurality of images;
    adding the initial keyframe to the plurality of keyframes; and
    for each image in at least a subset of the plurality of images:
        determining an amount that the image overlaps each keyframe within the plurality of keyframes, and if the amount of overlap is less than the predetermined threshold, adding the image to the plurality of keyframes.

8. The method of claim 7, wherein determining the amount of image overlap between each image and a keyframe comprises:
creating an image plane that is contained within the keyframe, the image plane comprising a grid of 3D points;
determining how many of the 3D points are visible within the image; and
determining a percentage of visible points by dividing a number of visible points by a total number of 3D points.

9. The method of claim 1, wherein texturing the 3D mesh comprises color correcting portions of each of the plurality of keyframes.

10. The method of claim 9, wherein color correcting portions of each of the plurality of keyframes comprises color correcting triangles of each keyframe based on adjacent triangles.

11. A non-transitory computer-readable medium (NTCRM) containing instructions that, when executed by a processor, cause an apparatus to:
receive, from a capturing device, a video of a three-dimensional space by moving the capturing device about the space, the video comprised of a plurality of images;
receive, from motion sensors, motion data of the capturing device as it is moved about the space simultaneously with the captured video and obtaining depth data;
generating a 3D mesh of the space from the video and the motion data
select, while the video and motion data are being captured, a plurality of keyframes from the plurality of images, each of the plurality of keyframes having an overlap with other individuals of the plurality of keyframes that is less than a predetermined threshold; and
texture, while the video and motion data are being captured, the 3D mesh with the plurality of keyframes;
detecting a warped or distorted area in the 3D mesh; and
retexturing all or a portion of the warped or distorted area with a different keyframe taken from a different perspective.

12. The NTCRM of claim 11, wherein the instructions are to cause the apparatus to select the plurality of keyframes and texture the 3D mesh progressively while the video of the three-dimensional space is being captured.

13. The NTCRM of claim 12, wherein the instructions are to cause the apparatus to refine the texturing as additional captures of previously textured areas are received from the capturing device.

14. The NTCRM of claim 11, wherein the instructions are to cause the apparatus to enhance a geometry of the 3D mesh.

15. The NTCRM of claim 14, wherein to enhance the geometry of the 3D mesh, the instructions are to cause the apparatus to:
capture a plurality of 3D points; and
for each of the plurality of 3D points:
identify one or more neighboring points within the 3D point's neighborhood, the neighborhood defined as a predetermined radius around the 3D point;
compute an intersection point of a normal of the 3D point and each neighboring point; and
tag the 3D point as a curvature point when a distance between the 3D point and the intersection point is within a predetermined threshold; and
refine the 3D mesh to reflect a presence of the curvature points.

16. The NTCRM of claim 11, wherein to select the plurality of keyframes, the instructions are to cause the apparatus to:
determine from the motion data when the capturing device crosses a predetermined movement threshold;
capture, when the capturing device crosses the movement threshold, an image from the video; and
determine whether the captured image is suitable for texturing.

17. The NTCRM of claim 11, wherein to select the plurality of keyframes, the instructions are to cause the apparatus to:
select for an initial keyframe a first image from the plurality of images;
add the initial keyframe to the plurality of keyframes; and
for each image in at least a subset of the plurality of images:
determine an amount that the image overlaps each keyframe within the plurality of keyframes, and
if the amount of overlap is less than the predetermined threshold, add the image to the plurality of keyframes.

18. The NTCRM of claim 17, wherein to determine the amount of image overlap between each image and a keyframe, the instructions are to cause the apparatus to:
create an image plane that is contained within the keyframe, the image plane comprising a grid of 3D points;
determine how many of the 3D points are visible within the image; and
determine a percentage of visible points by dividing a number of visible points by a total number of 3D points.

19. The NTCRM of claim 18, wherein the grid of 3D points is a 32×32 grid of x-y-z coordinates.

20. The NTCRM of claim 11, wherein the instructions are to further cause the apparatus to color correct portions of each of the plurality of keyframes.

* * * * *